United States Patent [19]

Hironaka et al.

[11] Patent Number: 4,850,102
[45] Date of Patent: Jul. 25, 1989

[54] SYSTEM FOR INSTALLING PARTS ON WORKPIECE

[75] Inventors: Masakazu Hironaka; Takeo Yoshiji; Daizo Kaneko; Mizuo Shibazaki; Sumio Kurata, all of Saitama, Japan

[73] Assignee: Honda Giken Kogyo Kabushiki Kaisha, Tokyo, Japan

[21] Appl. No.: 20,325

[22] Filed: Feb. 27, 1987

[30] Foreign Application Priority Data

| Feb. 27, 1986 | [JP] | Japan | 61-43343 |
| Feb. 27, 1986 | [JP] | Japan | 61-43344 |
| Feb. 27, 1986 | [JP] | Japan | 61-43347 |
| Mar. 3, 1986 | [JP] | Japan | 61-46029 |
| Mar. 3, 1986 | [JP] | Japan | 61-46030 |
| Mar. 3, 1986 | [JP] | Japan | 61-30440[U] |

[51] Int. Cl.$^4$ .................................... B23P 21/00
[52] U.S. Cl. .................................... 29/787; 29/33 K; 29/795; 29/799; 29/822; 414/225
[58] Field of Search .............. 29/156.4 R, 700, 771, 29/787, 822, 783, 791, 795, 33 K, 741, 799; 414/225; 901/6; 81/57.22, 57.23, 57.36, 57.37

[56] References Cited

U.S. PATENT DOCUMENTS

| Re. 28,608 | 11/1975 | Dixon | 29/709 |
| 2,983,999 | 5/1961 | Sharpe | 29/712 X |
| 3,541,900 | 11/1970 | Mosier | 81/57.36 X |
| 4,397,084 | 8/1983 | Ebrey et al. | 29/749 |

FOREIGN PATENT DOCUMENTS 0089779 8/1983 European Pat. Off. .
58-34728 3/1983 Japan .

Primary Examiner—Timothy V. Eley
Assistant Examiner—Frances Chin
Attorney, Agent, or Firm—Irving M. Weiner; Joseph P. Carrier; Pamela S. Burt

[57] ABSTRACT

A parts installing system installs a plurality of parts on a workpiece substantially simultaneously. The system includes a parts stocker for stocking a cluster of substantially closely arranged parts thereon, and a parts transfer device for transferring the parts from the parts stocker to a prescribed position over the workpiece and setting the transferred parts over the workpiece. The parts transfer device includes a parts spreading mechanism unit which picks up the clustered parts from the parts stocker and spreads them into respective relative positions corresponding respectively to relative positions which will be taken by the parts set on the workpiece. The system also includes a pressing device for pressing the parts set over the workpiece onto the workpiece, and a bolt fastening device for fastening the pressed parts to the workpiece with bolts. The parts installing system is suitable for use on various automated production lines to achieve a high rate of production. For example, the parts installing system is particularly advantageous when employed on an engine assembling line for installing camshaft holders on a cylinder head, and also for installing bearing caps on a cylinder head.

16 Claims, 21 Drawing Sheets

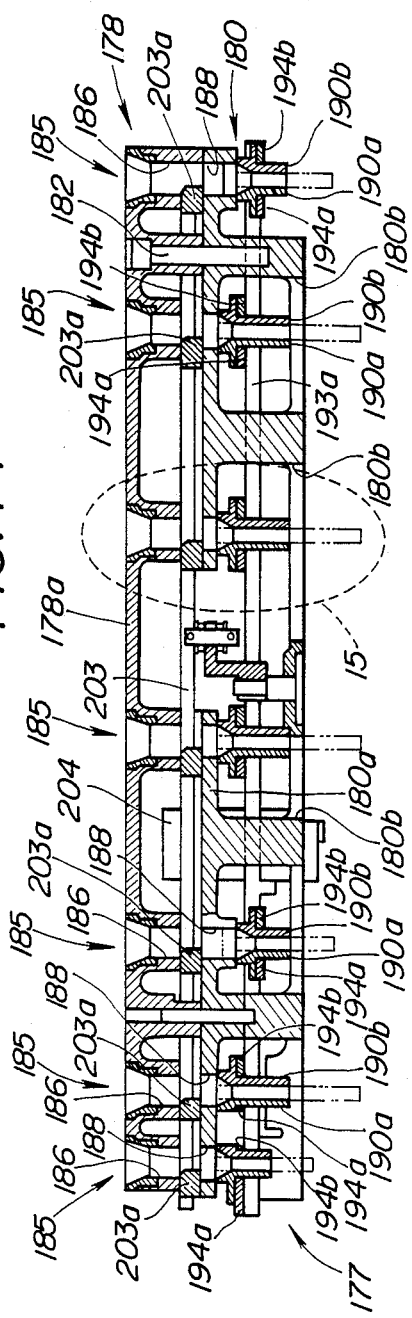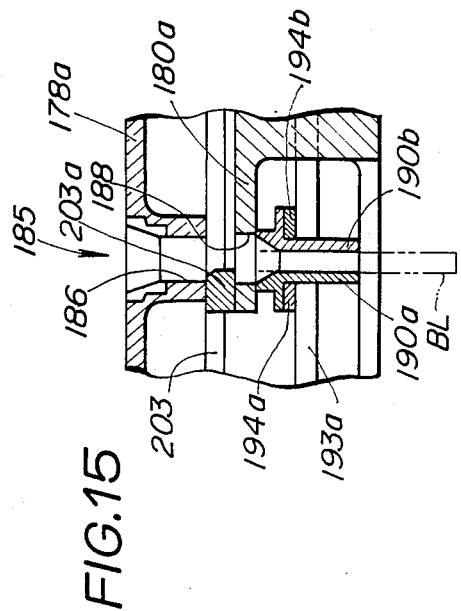

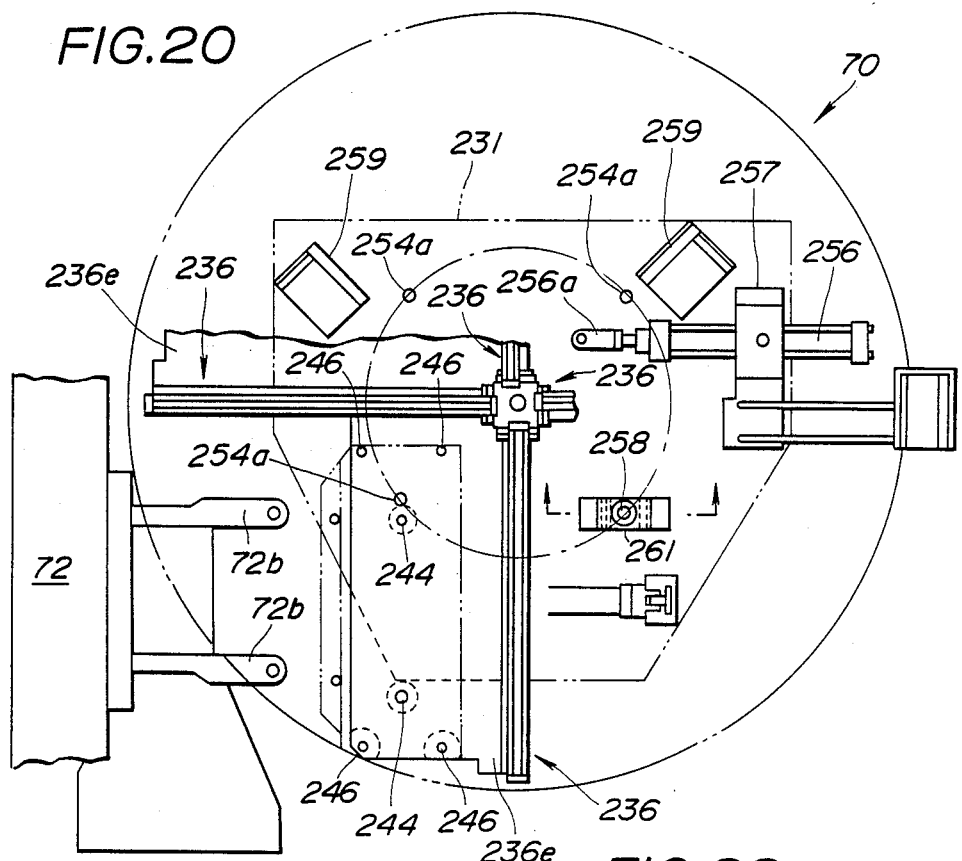
FIG.20
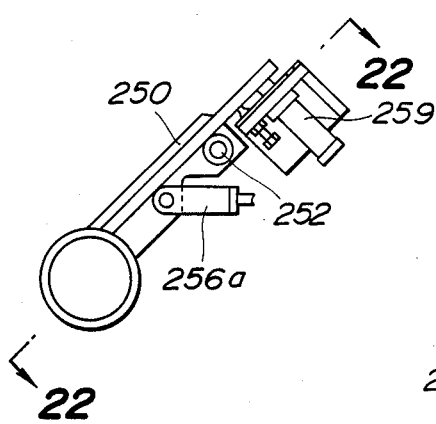
FIG.21
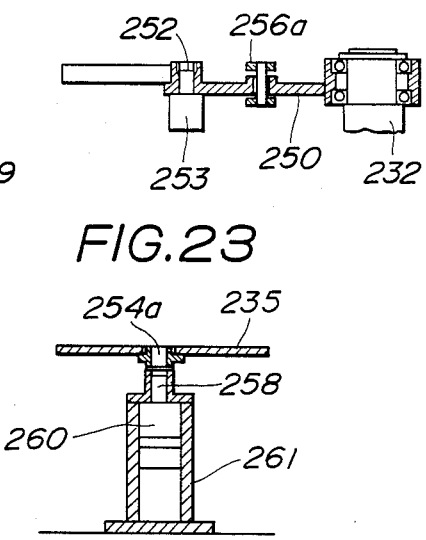
FIG.22
FIG.23

SYSTEM FOR INSTALLING PARTS ON WORKPIECE

BACKGROUND OF THE INVENTION

1. Field of the Invention

The present invention relates to an automatic parts installing system, and more particularly to a system for installing a plurality of parts substantially simultaneously on a workpiece by pressing the parts onto the workpiece.

2. Description of the Relevant Art

In the manufacture of machines such as automotive engines, it is often customary to install a number of parts on a workpiece with an automatically installing machine. Where parts are not required to be installed on a workpiece in a prescribed sequence in such an assembling process, the parts may be assembled on the workpiece substantially simultaneously for a higher rate of production. In some applications, a plurality of components must be installed in a relatively small area with high accuracy. For example, bearing caps supporting crankshaft bearings are installed on the cylinder block of a multicylinder internal combustion engine. In such an application, the installing process requires a special arrangement for simultaneous installation of the parts on the workpiece.

One conventional automatic installing apparatus having such an arrangement is disclosed in Japanese Laid-Open Patent Publication No. 58-34728 published March 1, 1983. The disclosed apparatus is an installing system for simultaneously installing one set of parts, such as bearing caps, required by a single internal combustion engine on a workpiece such as the cylinder block of the engine. The system has a pre-positioning device for arranging the parts in relative positions corresponding to respective positions assumed by the parts after being installed on the workpiece, and a transfer device for picking up the pre-positioned parts and moving them to respective positions over the workpiece. The system requires an area in which the parts can be pre-positioned by the pre-positioning device, and another area in which the pre-positioned parts can be picked up by the transfer device. These areas or spaces impose limitations on the designing of the overall system, and result in a large floor space which is taken up by the parts installing apparatus. Another problem is that the system has a low efficiency because of the time required to carry parts from the pre-positioning device over to the transfer device.

SUMMARY OF THE INVENTION

In view of the aforesaid drawbacks of the conventional automatic parts installing systems, it is an object of the present invention to provide a system for installing a plurality of parts substantially simultaneously on a workpiece, the system occupying a reduced floor space and being capable of installing parts with high efficiency.

According to the present invention, a system for installing a plurality of parts substantially simultaneously on a workpiece comprises parts stocker means for stocking thereon a cluster of substantially closely placed parts to be installed, and parts transfer means for transferring the parts from said parts stocker means into respective positions over a workpiece and setting the transferred parts in position over the workpiece. The parts transfer means includes spreading means for picking up the clustered parts from the parts stocker means and spreading the clustered parts into respective relative positions corresponding to respective relative positions which will be assumed by the parts as set over the workpiece. The system also includes pressing means for pressing the parts set over the workpiece onto the workpiece, and fixing means for securely fixing the pressed parts to the workpiece.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 14 is a cross-sectional view taken along line 14—14 of FIG. 13;

FIG. 15 is an enlarged fragmentary view of an enclosed area 15 in FIG. 14;

FIG. 20 is a schematic plan view showing the layout of elements of the tools stocker illustrated in FIG. 19;

FIG. 21 is a plan view of an indexing swing arm of the tools stocker of FIG. 19;

FIG. 22 is a cross-sectional view taken along line 22—22 of FIG. 21;

FIG. 23 is a sectional side elevational view of a locating pin of the tools stocker of FIG. 19;

DETAILED DESCRIPTION OF THE PREFERRED EMBODIMENTS

1. General arrangement

Figure 1:
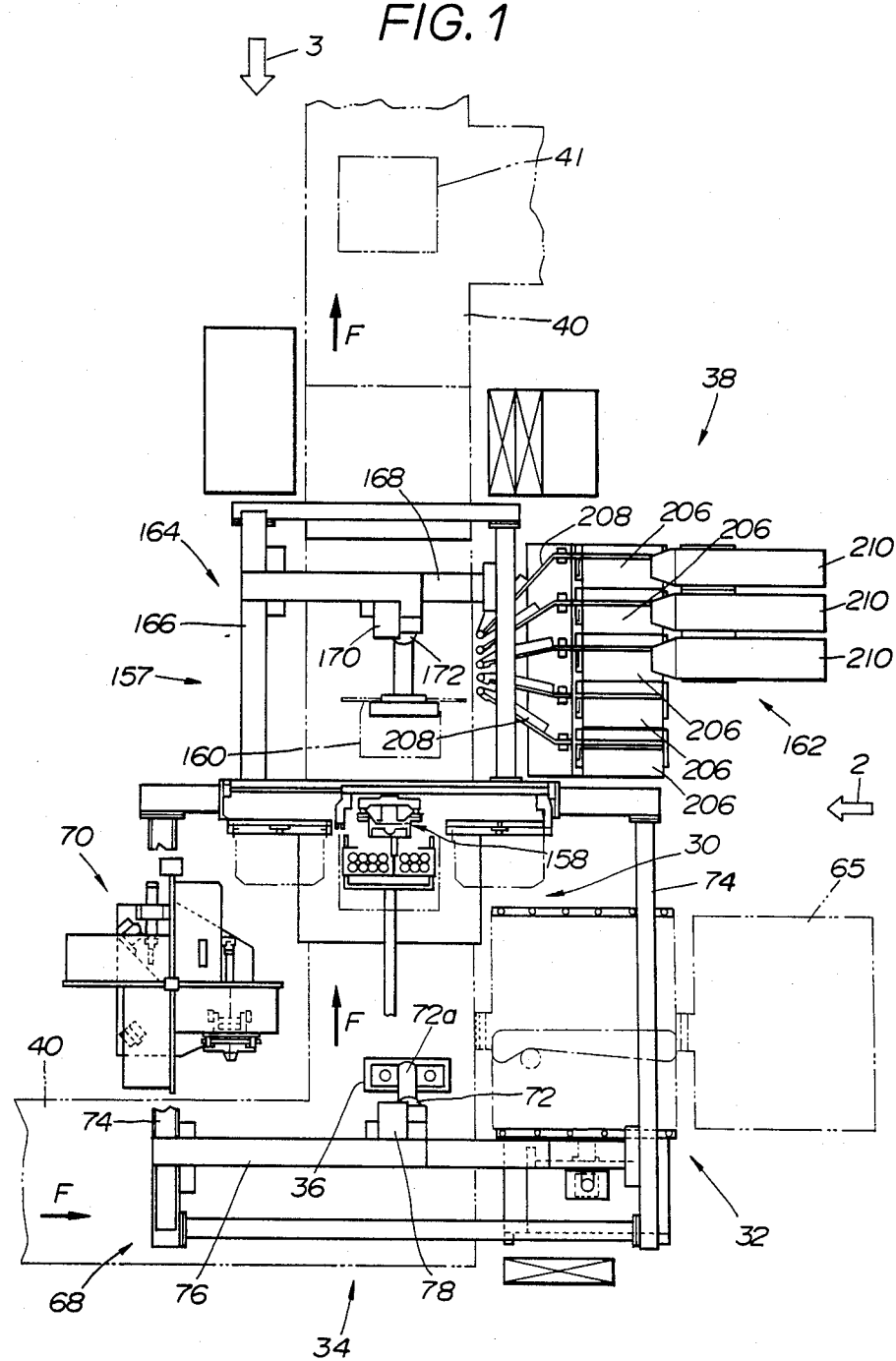
FIG. 1 is a plan view of a parts installing system according to a preferred embodiment of the present invention.

A parts installing system in a preferred embodiment of the present invention, which will be described below, is constructed as an automated work station for installing a set of camshaft holders which hold camshafts on cylinder heads in a production line for multicylinder internal combustion engines having an overhead camshaft valve train. The parts installing system essentially comprises:

a. a pressing device 30 for pressing parts (camshaft holders) set over a workpiece (cylinder head) onto the workpiece;

b. a part stocker 32 having a tray on which the parts to be installed are substantially closely placed in a cluster;

c. a parts transfer device 34 for transferring the parts on the tray of the parts stocker 32 toward the pressing device 30;

d. a parts spreading mechanism unit 36 mounted on the parts transfer device 34 for picking up the clustered parts on the tray and spreading the parts into respective relative positions corresponding respectively to relative positions which will be assumed by the parts set on the workpiece;

e. a bolt fastening device 38 for fastening the parts pressed on the workpiece to the workpiece with bolts; and f. other devices and mechanisms.

The parts installing system is controlled by a suitable control system. Since such a control system for controlling the parts installing system could easily be accomplished by one skilled in the art, particularly in the automation field, based on the description of the preferred embodiments, given below, the details of the control system will not be described below.

The components of the parts installing system of the invention will hereinafter be described.

2. Pressing device

Figure 2:
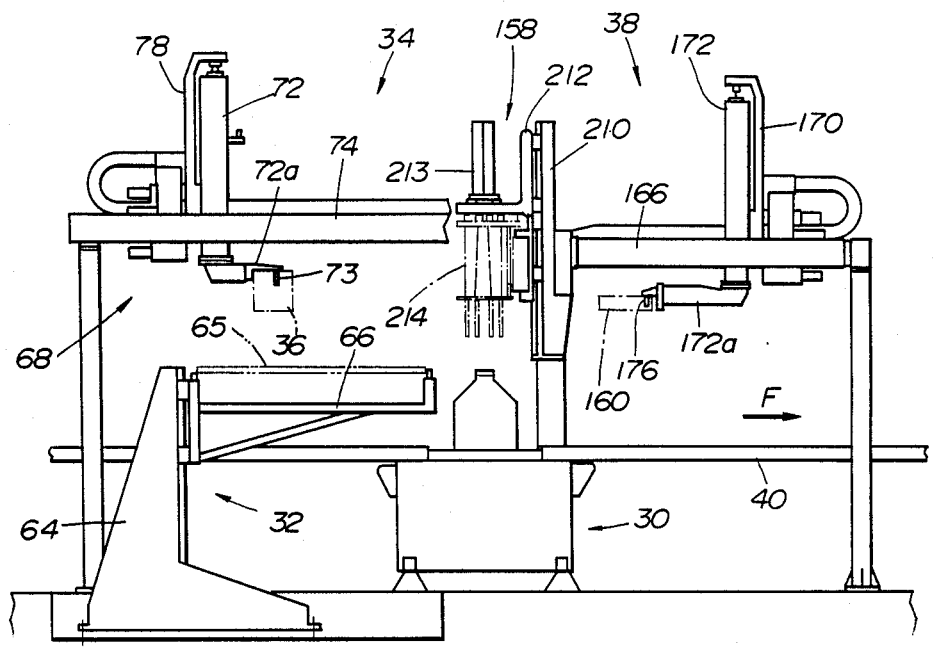
FIG. 2 is a side elevational view of the system shown in FIG. 1, as viewed in the direction of the arrow 2 in FIG. 1.
Figure 3:
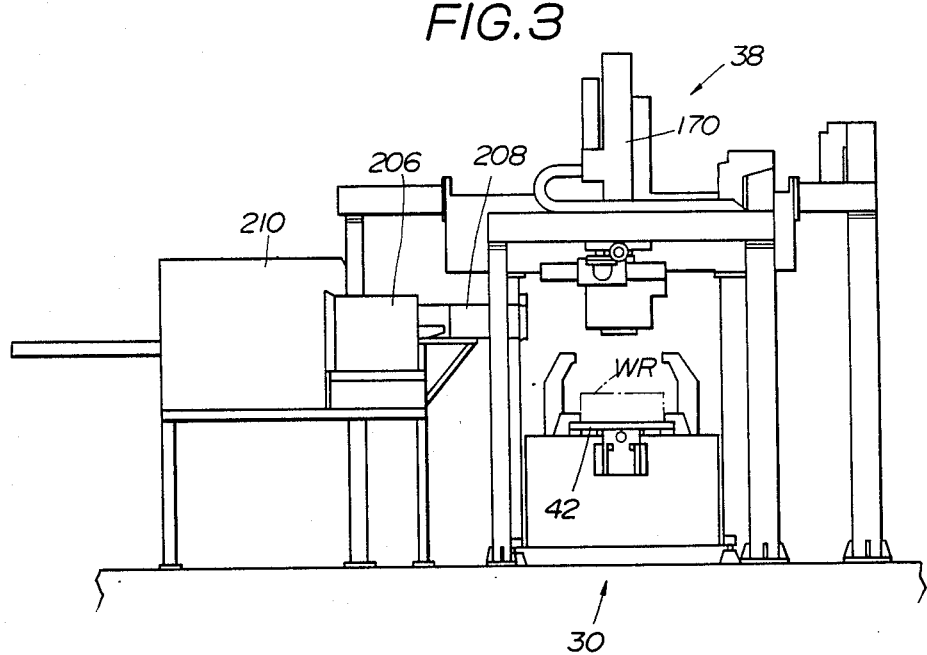
FIG. 3 is a side elevational view of the system shown in FIG. 1, as viewed in the direction of the arrow 3 in FIG. 1.
Figure 4:
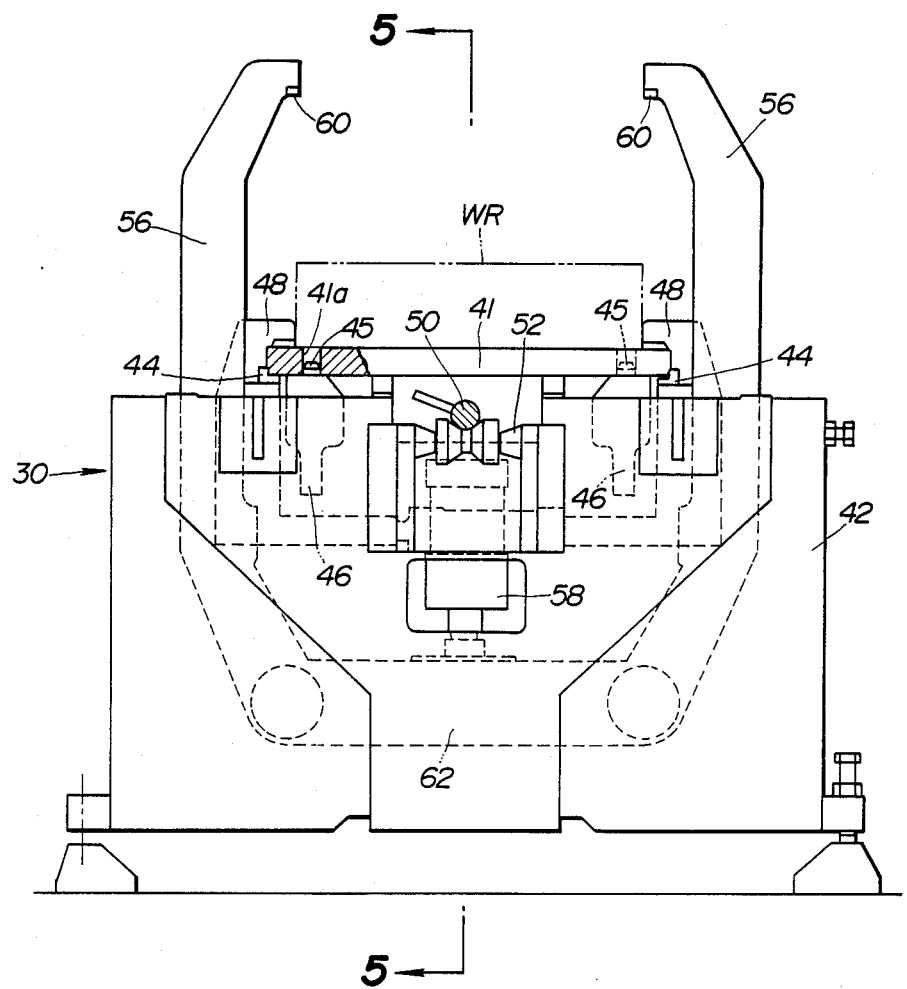
FIG. 4 is a side elevational view of a pressing device in the system of FIG. 1, as viewed in the direction of a feed line.
Figure 5:
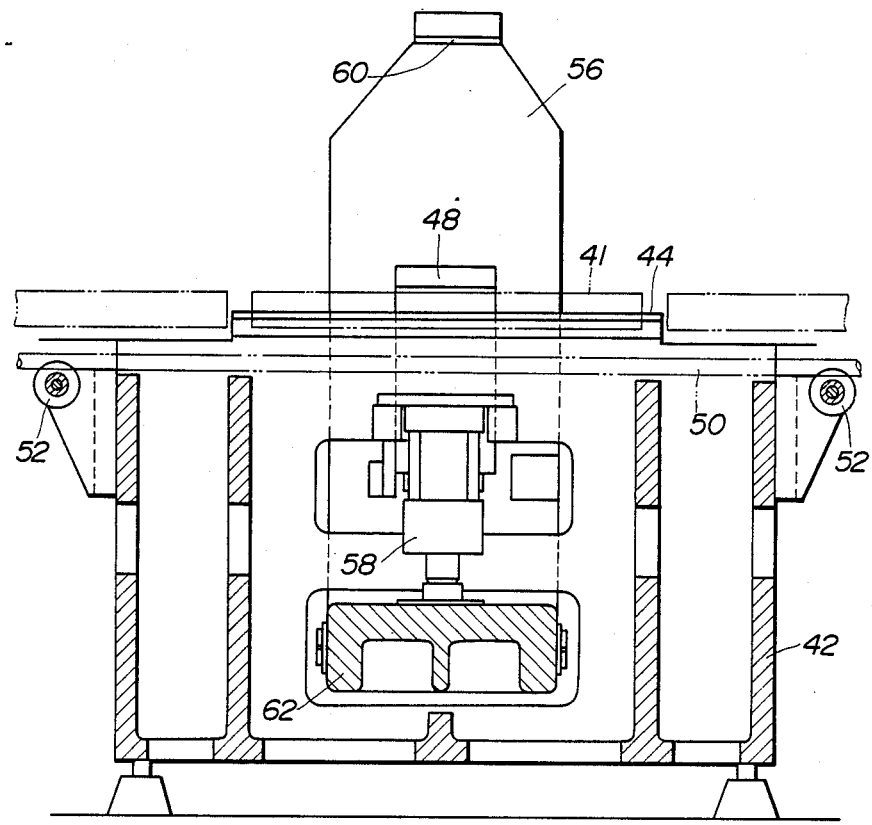
FIG. 5 is a cross-sectional view taken along line 5—5 of FIG. 4.

As shown in FIGS. 1 through 3, the pressing device 30 is used in conjunction with a feed line 40 which conveys a pallet 41 on which a workpiece WR is placed. The pallet 41 is moved along the feed line 40 in the direction of the arrows F (FIG. 1 and 2). As illustrated in FIGS. 4 and 5 in greater detail, the pressing device 30 includes a stationary base 42 to which there is fixed a pair of support rails 44 aligned respectively with rails of the feed line. Locating pins 45 are vertically movable supported by respective holders 46 affixed to the base 42. The locating pins 45 have upper ends engageable respective in locating holes 41a defined in the pallet 41. When the locating pins 45 engage in the locating holes 41a, the pallet 41 is positioned precisely in a working position of the pressing device 30. The stationary base 42 has vertically movable holder arms 48 for clamping the pallet 41 between the support rails 44. The pallet 41 positioned by the locating pins 45 is clamped by the holder arms 48 while parts are being installed on the workpiece. The pallet 41 can be loaded into and out of the working position in a general process by means of a transfer bar 50 supported on a guide roller 52 mounted on the base 42.

The pressing device 30 has a presser mechanism including a pair of presser arms 56 vertically movable supported by the base 42 in the vicinity of the working position and extending substantially upward, and a hydraulic cylinder unit 58 for actuating the presser arms 56. The presser arms 56 have upper ends bent inwardly toward each other and including jaws 60, respectively, on their lower surfaces. The lower ends of the presser arms 56 are interconnected by a horizontal bar 62 with its central portion coupled to a vertically movable actuation rod of the hydraulic cylinder unit 58. The hydraulic cylinder unit 58 has a body attached to the base 42. The hydraulic cylinder unit 58 is controlled by an appropriate hydraulic pressure circuit (not shown). When actuated, the hydraulic cylinder unit 58 moves the presser arms 56 downwardly under hydraulic pressure. The presser mechanism cooperates with the support rails 44 in operating as a vise.

Camshaft holders which are pressed onto a cylinder head will finally be securely fastened to the cylinder head by means of bolts. Each of the camshaft holders has holes for inserting bolts therethrough, and the cylinder heads have threaded holes corresponding respectively to the holes of the camshaft holders. One of the bolt holes of each camshaft holder has a positioning hole coaxial with the bolt hole, the positioning hole being defined in a lower end of the bolt hole which faces the cylinder head. The threaded hole of the cylinder head which is associated with the bolt hole having the positioning hole has an upper end in which a knock pin in the form of a hollow cylinder is retained in coaxial relation to the threaded hole. When the camshaft holders are pressed onto the cylinder head, the knock pins on the cylinder head are pressed into the positioning holes of the camshaft holders, thus positioning the camshaft holders on the cylinder head. The knock pins as described above are of known construction and will not be illustrated. The knock pins are not essential in the present invention, and any of various other known structures may be employed for positioning parts on a workpiece while they are being pressed onto the workpiece.

3. Parts stocker

The parts stocker 32 serves as part of a parts feeder system for supplying parts to the parts transfer device 34, which will be described later. The parts stocker 32 employs a tray and has an advantageous arrangement for feeding the parts to the parts transfer device.

As shown in FIGS. 1 and 2, the parts stocker 32 is located on one side of the feed line 40 upstream of the working position with respect to the direction of the arrow F. The parts stocker 32 comprises a stationary base 64 and a support 66 mounted on the base 64 for supporting a tray 65. The tray 65 holding thereon as many parts as required for installation on a prescribed number of workpieces or engines is placed on the support 66. After all of the parts on the tray 65 have been installed on the workpieces, the empty tray 65 is removed from the support 66, and another tray loaded with parts is placed on the support 66. Such tray replacement may be effected using a general tray moving means (not shown).

Figure 6:
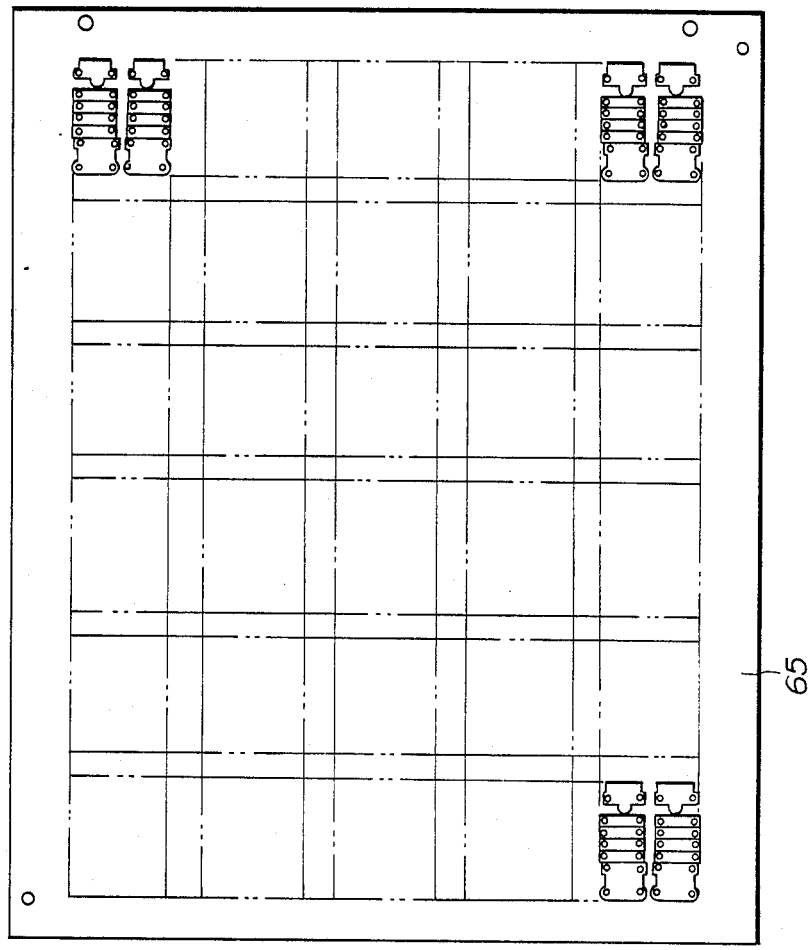
FIG. 6 is a schematic plan view of parts placed on a tray of a parts stocker in the system of FIG. 1, the parts shown here being camshaft holders in a first specific application of the system of FIG. 1.

FIG. 6 schematically shows parts neatly placed on the tray 65. In the illustrated system application, the internal combustion engine on which the parts will be installed has a double-overhead-camshaft (DOHC) valve train, and hence two camshafts. Each of the two camshafts is supported by six camshaft holders. Thus, a total of twelve camshaft holders are installed on a single cylinder head. As illustrated in FIG. 6, a set of twelve camshaft holders for one engine are substantially closely placed in a cluster on the tray 65, and many such sets are located in rows and columns on the tray 65. However, only three sets of camshaft holders are illustrated in FIG. 6, with the other sets omitted from illustration for brevity. Since the parts are clustered at high packing density on the tray, the space required for storing and carrying the parts can be reduced, and the inner space of the factory can be utilized efficiently.

4. Parts transfer device

Figure 19:
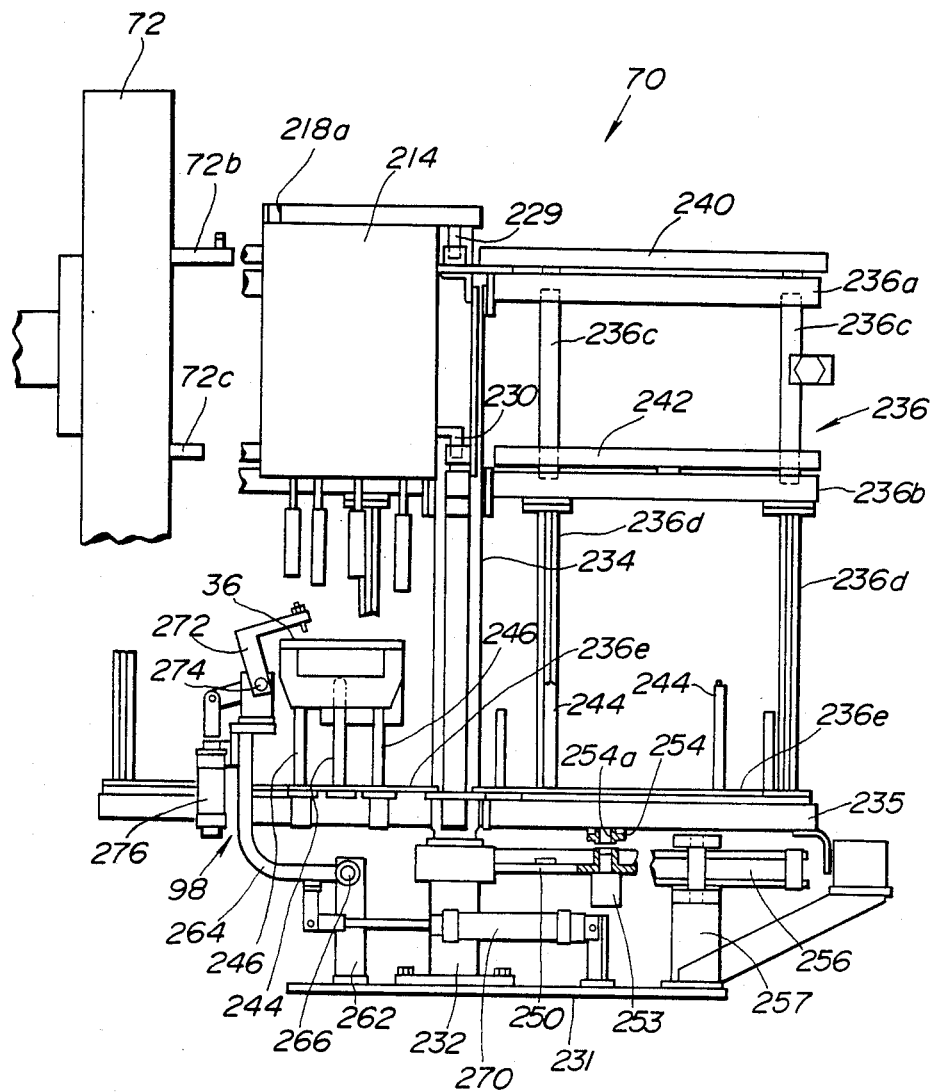
FIG. 19 is a side elevational view of a tools stocker in the system of FIG. 1.

As shown in FIGS. 1 through 3, the parts transfer device 34 includes a moving system 68 having a carriage 72 movable in the directions of X, Y, and Z axes. The carriage 72 is movable between the pressing device 30 and the parts stocker 32 under the control of the control system. In the preferred embodiment, the carriage 72 is also movable to access a tool stocker 70 (described later) for the storage of tool heads which is located in confronting relation to the parts stocker 32 with the feed line 40 therebetween, so that the parts transfer device 34 will double as a tool changer. The moving system 68 includes a pair of parallel stationary rails 74 disposed above the parts stocker 32 and the tool stocker 70 and extending horizontally in the direction of the X axis along which the palet 41 can be fed in the pressing device 30. A beam 76 extending in the direction of the Y axis (which is normal to the X-axis direction) lies across and between the rails 74, and is movable along the rails 74 in the X-axis direction. A slider 78 is mounted on the beam 76 and movable along the beam 76 in the Y-axis direction. The carriage 72 is mounted on the slider 78 for vertical movement in the Z-axis direction. The moving system 68 also includes actuators of general construction for driving the beam 76, the slider 78, and the carriage 72, respectively, under the control of the control system. The carriage 72 has a horizontal arm 72a having a pair of vertical locating pins 73 (FIGS. 2 and 8) extending downwardly from the distal end of the arm 72a. Moreover, the carriage 72 has engaging members 72b, 72c for a wrench unit (described later), which are mounted on the front surface of the carriage 72 as shown in FIG. 19.

5. Parts spreading mechanism

The parts spreading mechanism unit 36 is removably attached to the locating pins 73 of the carriage 72. In this embodiment, the parts spreading mechanism unit 36 is constructed as a replaceable unit or tool head. The parts installing system of the invention can be employed to install parts on many different types of engines by replacing the parts spreading mechanism unit with other parts spreading mechanism units.

Figure 7:
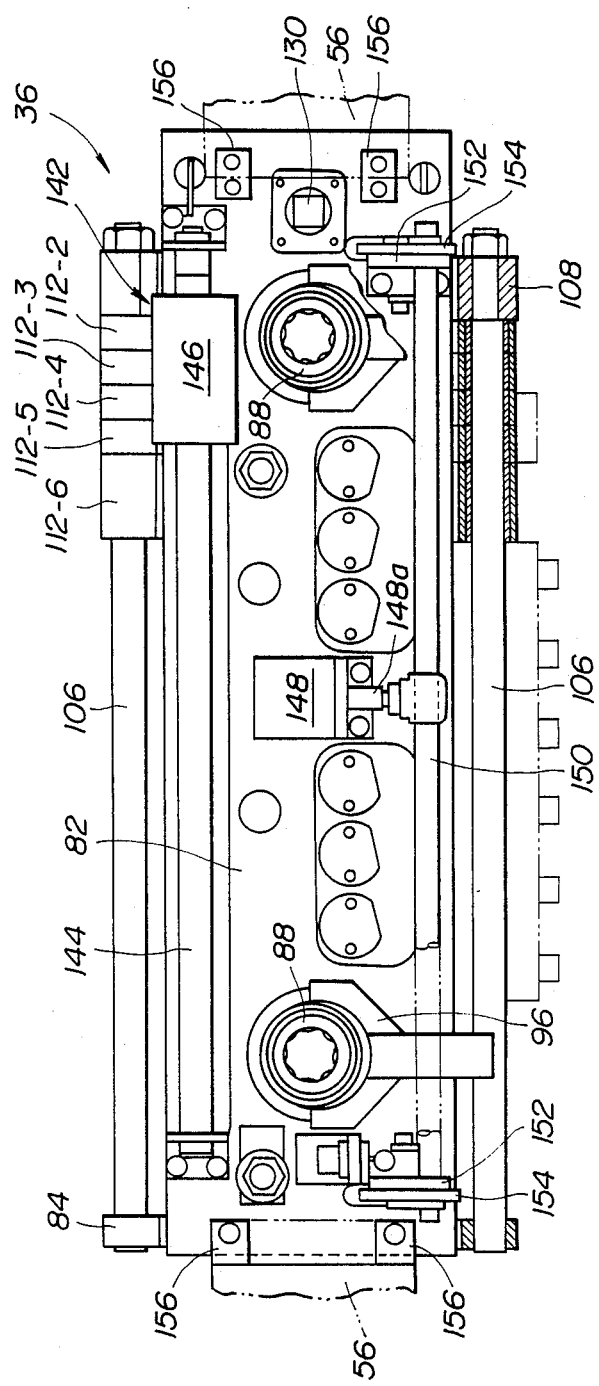
FIG. 7 is a plan view, partly in cross section, of a parts spreading mechanism unit for a parts transfer device in the system of FIG. 1.
Figure 8:
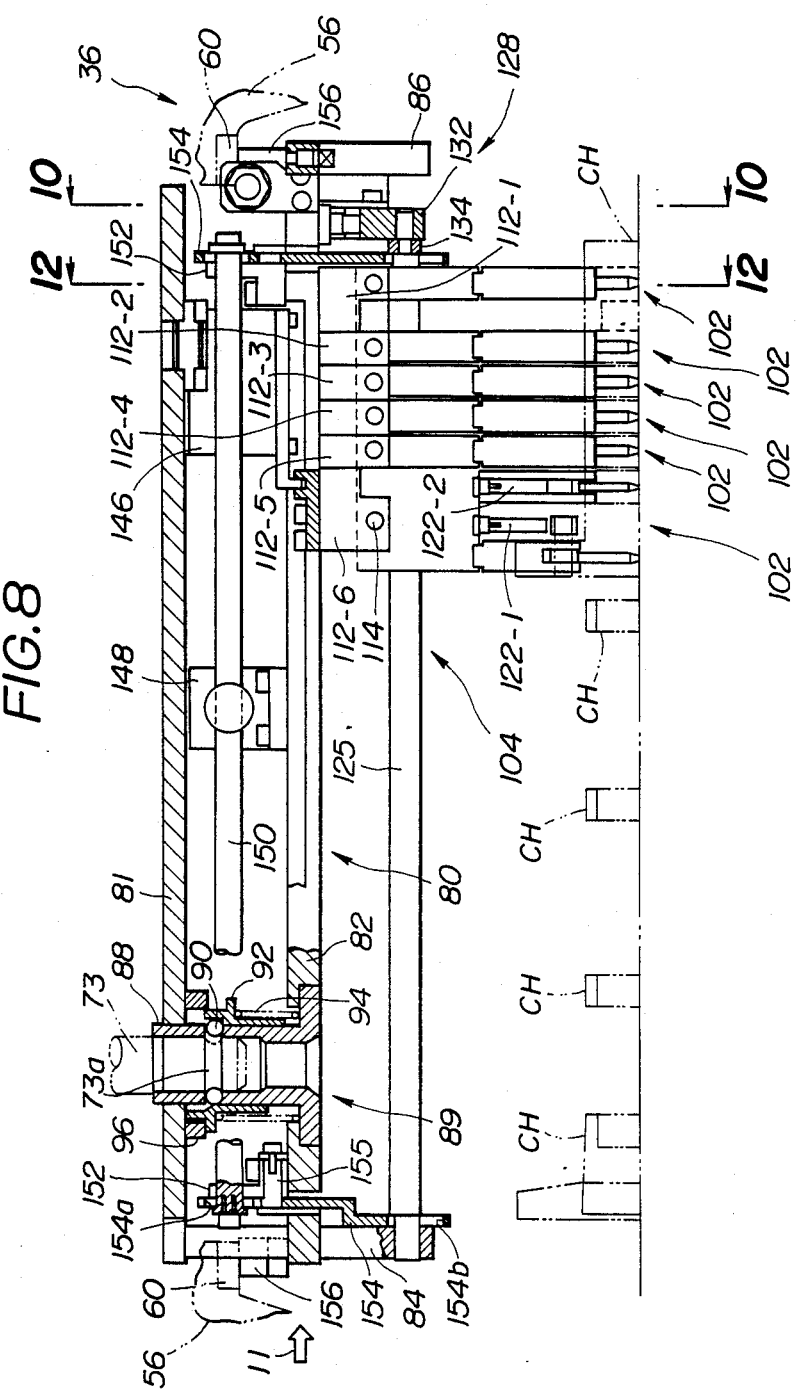
FIG. 8 is a side elevational view, partly in cross section, of the unit shown in FIG. 7.

As shown in FIGS. 7 through 12, the parts spreading mechanism unit 36 has a box-shaped frame 80 comprising upper and lower horizontal plates 81, 82 of an elongate rectangular shape, and vertical end plates 84, 86 interconnecting the upper and lower plates 81, 82. However, the upper plate is omitted from illustration in FIG. 7 in order to show elements below the upper plate. The distal ends of the vertical locating pins 73 of the carriage 72 are received in a pair of vertical sleeves 88, respectively, which are mounted on the frame 80 near the opposite ends thereof. As best shown in FIG. 8, the distal end of each of the locating pins 73 has an annular groove 73a. Each sleeve 88 has a locking mechanism 89 comprising steel balls 90 engageable in the annular groove 73a, a retainer 92 for retaining the steel balls 90, a spring 94 for normally urging the retainer 92 upwardly, and a shifter 96 for moving the retainer 92 downwardly. When the retainer 92 is in an upper position it causes the steel balls 90 to ride in the annular groove 73a of the locating pin 73. When in a lower position, the retainer 92 allows the steel balls 90 to be displaced out of the annular groove 73a. The shifter 96 has one end pivotally mounted on the upper plate 81, with the other end thereof being swingable and engaging a flange on the upper end of the retainer 92. The retainer 92 can be moved between the upper and lower positions by an unlocking mechanism 98 (FIG. 19) of the tool stocker 70 which moves the shifter 96. The unlocking mechanism 98 will be described later in conjunction with the tool stocker 70.

Figure 12:
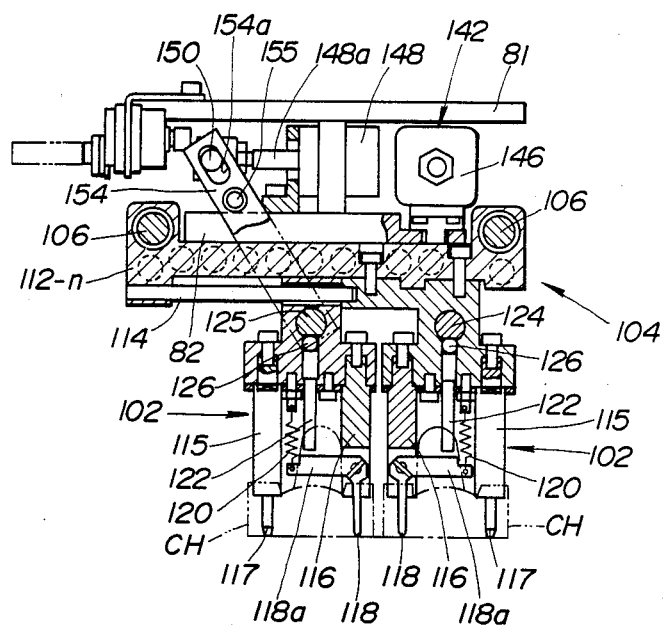
FIG. 12 is a cross-sectional view taken along line 12—12 of FIG. 8.
Figure 13:
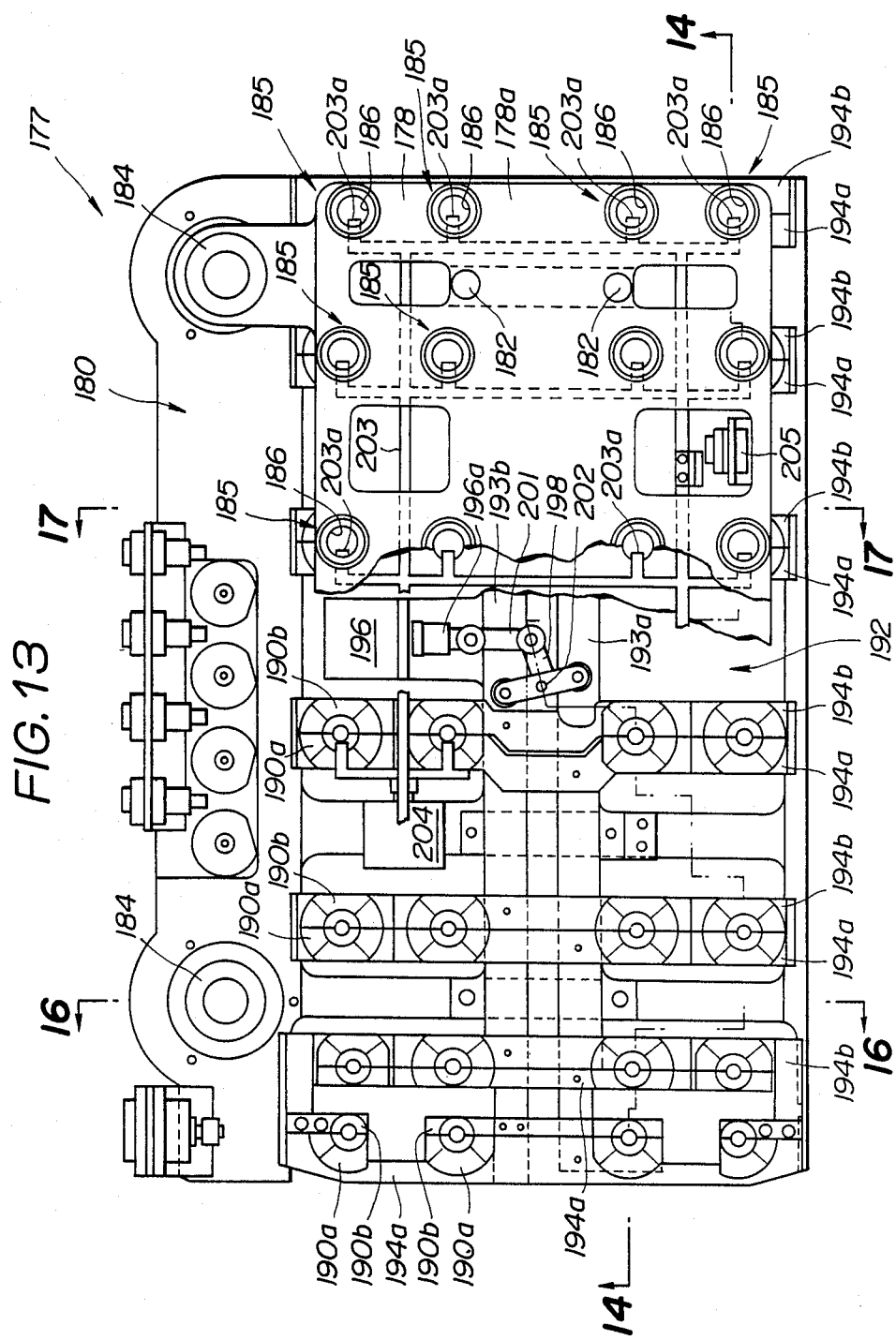
FIG. 13 is a plan view, partly broken away, of a bolt locator unit for a bolt setter in the system of FIG. 1.

Twelve clamps 102 are suspended from the frame 80 by a suspension structure 104 for holding the twelve camshaft holders, respectively. The suspension structure 104 includes a pair of parallel horizontal guide rails 106 disposed on opposite sides of the lower plate 82 and extending longitudinally of the frame 80. Each of the guide rails 106 has one end supported by the end plate 84 on one end of the frame 80, and the other end supported by a bracket 108 positioned near the opposite end of the frame 80. The bracket 108 has an integral fixed clamp hanger (first hanger) 112-1. Five movable clamp hangers 112-2 through 112-6 (second through sixth hangers) are slidably supported on the guide rails 106, the second hanger being closest to the first hanger and the sixth hanger farthest from the first hanger. As shown in FIG. 12, two clamps 102 are supported on each clamp hanger, which is denoted generally by 112-n, and one of the clamps 102 is directly affixed to the hanger whereas the other clamp 102 is suspended from the hanger by a guide rod 114 for movement longitudinally of the hanger, i.e., laterally across the frame 80. The six clamps directly affixed to the respective hangers are arrayed in a row along the guide rails 106 at all times, but the distances between these clamps are variable. These six clamps will be referred to as the first row of clamps. Similarly, the other six clamps movably mounted on the respective hangers are arranged in another row along the guide rails 106, with the distances therebetween being also variable. These movable clamps will be referred to as the second row of clamps.

The clamp 102 will be described in detail below. The clamp 102 is of a shape and dimensions designed to suit a component to be clamped thereby. In the preferred embodiment, each of the camshaft holders in one set, except two camshaft holders, has two vertical holes for passage therethrough of respective bolts to be threaded into the cylinder head. The exceptional two camshaft holders having four holes each. The ten clamps on the five hangers, from the first to fifth hangers, serve to hold those camshaft holders which have two vertical bolt holes each, and will first be described. As best shown in FIG. 12, each of these clamps has a first column 115 and a second column 116 which are spaced from each other in the longitudinal direction of the hanger, i.e., in the transverse direction of the frame 80. Each of these columns 115, 116 extends downwardly and has vertical pins 117, 118 on the lower end thereof. The pins 117, 118 will be inserted in and engage the inner surfaces of the vertical bolt holes of a camshaft holder CH. The pin 117 is secured to the first column 115. The clearance between the pin 117 and the inner surface of the bolt hole in which the pin 117 is inserted is small, so that the pin 117 serves to position the clamped camshaft holder CH with respect to the clamp 102. The other pin 118 is movable toward and away from the fixed pin 117. The clearance between the pin 118 and the inner surface of the bolt hole in which the pin 118 is inserted is relatively large, so that the camshaft holder CH can be clamped and unclamped by movement of the movable pin 118.

The movable pin 118 has an upper end pivotally attached to the second column 116 and includes an arm 118a extending from the upper end thereof horizontally toward the first column 115. The distal end of the arm 118a is urged upwardly by a spring 120, which thus biases the lower end of the movable pin 118 toward the fixed pin 117. Each of the clamps has a vertical pusher rod 122 disposed between the columns 115, 116 and vertically movably supported by the clamp. The lower end of the vertical pusher rod 122 is held in abutment against the arm 118a of the movable pin 118, and the upper end thereof engages one of two cam members (first and second cam members 124, 125) through a steel ball 126.

The two clamps mounted on the sixth hanger 112-6 serve to clamp camshaft holders having four vertical holes each. Each of the clamps on the sixth hanger has four vertical columns, two of which are identical to the first column 115 with the fixed pin and other two of which are identical to the second column 116 with the movable pin. As shown in FIG. 8, a pusher rod 122-1 for pushing one of the movable pins is displaced toward another pusher rod 122-2 for pushing the other movable pin in order to avoid physical interference with the camshaft holders.

As shown in FIGS. 8 and 12, each of the cam members 124, 125 is in the form of a rod having a segment shaped cross section and is rotatable about its own axis. When the cam member is in an original angular position, the steel ball 126 is held in contact with a flat surface of the cam member. The pusher rod 122 is moved downwardly when the cam member is rotated in either direction about its own axis from the original angular position. The cam members 124, 125 extend horizontally in the longitudinal direction of the frame 80 parallel to the guide rails 106 substantially over the entire length of the guide rails 106. The first cam member 124 extends through all of the six clamps in the first row which are secured to the respective hangers for simultaneously actuating those clamps. The second cam member 125 extends through all of the six clamps in the second row which are movably mounted on the respective hangers for simultaneously actuating those clamps. The ten clamps on the five movable hangers slidable along the guide rails 106 are slidable with respect to and along the cam members 124.

Figure 10:
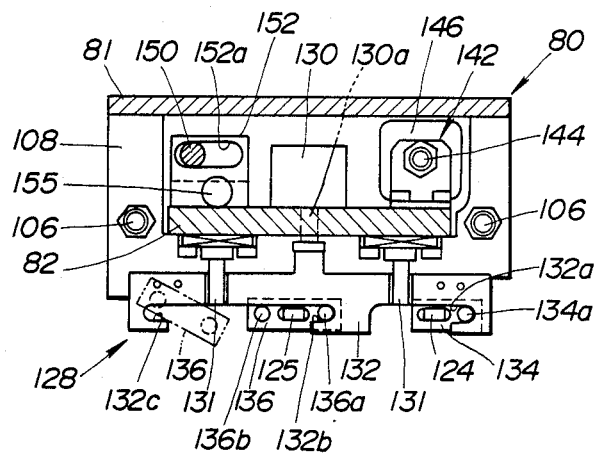
FIG. 10 is a cross-sectional view taken along line 10—10 of FIG. 8.
Figure 11:
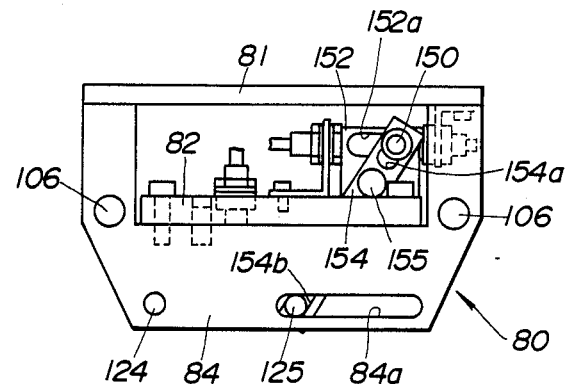
FIG. 11 is an end view of the unit shown in FIG. 8, as viewed in the direction of the arrow 11 in FIG. 8.

As illustrated in FIGS. 8 and 10, a clamp actuating mechanism 128 is mounted on one end of the frame 80 for operating the cam members 124, 125 to actuate the clamps. The clamp actuating mechanism 128 includes a pneumatic actuator 130 fixed to the lower plate 82 and having a downwardly extending and vertically movable rod 130a. An operating block 132 is joined to the lower end of the rod 130a and guided by a pair of vertical guide rods 131 for vertical movement, the operating block 132 having three engaging notches 132a, 132b, 132c. To one end of the first cam member 124, there is attached a first link plate 134 having an engaging pin 134a engaging in the engaging notch 132a. Similarly, a second link plate 136 is attached to one end of the second cam member 125 and has engaging pins 136a, 136b engageable in the engaging notches 132b, 132c, respectively. The second cam member 125 is movable between first and second positions in the transverse direction of the frame 80. When the second cam member 125 is in the first position, the engaging pin 136a engages in the engaging notch 132b, and when the second cam member 125 is in the second position, the engaging pin 136b engages in the engaging notch 132c. Upon the actuator 130 moving the operating block 132 upwardly, the engaging pin 134a of the first link plate and one of the engaging pins 136a, 136b of the second link plate which engages in the corresponding engaging notch of the operating block 132 are lifted, thus rotating the cam members 124, 125 about their own axes to displace the pusher rods 122 downwardly for thereby unclamping all of the twelve clamps. The second link plate 136 is indicated by the imaginary lines in FIG. 10 as being operated by the operating block 132 when the second cam member 125 is in the second position.

Figure 9:
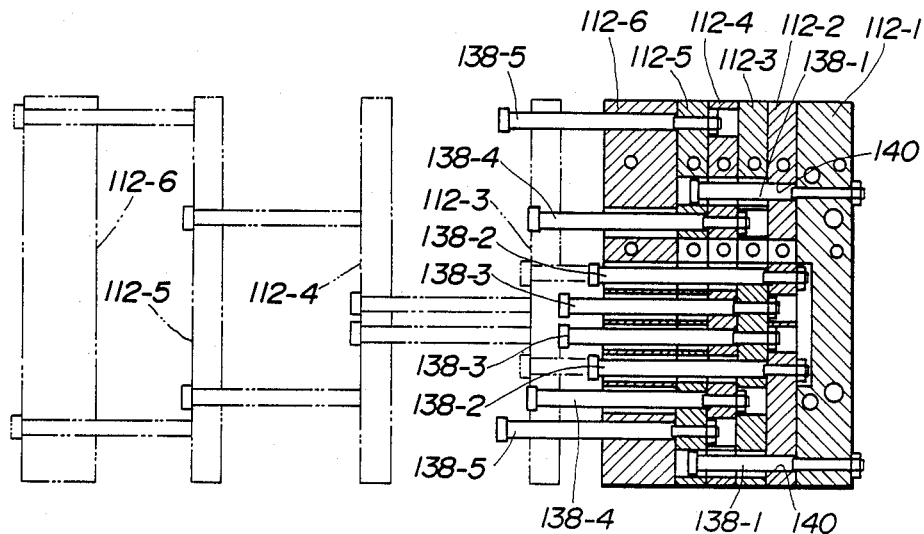
FIG. 9 is a plan view, partly in cross section, of a clamp interval limiting mechanism in the unit of FIG. 8.

The parts spreading mechanism unit 36 includes an arrangement for selectively increasing or reducing the distances between the clamp hangers to prescribed distances. As shown in FIG. 9, such an arrangement has a pair of stopper bolts on each of the first through fifth hangers 112-1 through 112-5 for limiting the distance between the hanger and the next hanger (for example, the stopper bolts on the first hanger 112-1 serve to limit the distance between the first hanger 112-1 and the second hanger 112-2) to a certain value. More specifically, the distance between the first and second hangers 112-1, 112-2 is limited by stopper bolts 138-1 having first ends fixed to the first hanger 112-1 and extending through holes 140 defined in the second hanger 112-2 parallel to the guide rails 106. The stopper bolts 138-1 have heads on the other ends. The heads of the stopper bolts 138-1 are engageable with the second hanger 112-2 at edges of the holes 140 to limit the distance between the first and second hangers 112-1, 112-2. The third through fifth hangers 112-3 - 112-5 have openings to avoid physical interference with the heads of the stopper bolts 138-1. The second through fifth hangers have respective pairs of stopper bolts 138-2 through 138-5 which have the same function as that of the stopper bolts 138-1. The hangers are indicated by the imaginary lines in FIG. 9 when the distances between the hangers are increased to their limits.

As shown in FIG. 7, a pneumatic actuator (first actuator) 142 comprising a cylindrical tube 144 and a runner 146 movable on and along the cylindrical tube 144 is mounted on the lower plate 82 of the frame 80. The pneumatic actuator of this type is sometimes referred to as a rodless cylinder. The pneumatic actuator 142 is coupled to an appropriate pneumatic pressure circuit (not shown) for controlling movement of the runner 146 under pneumatic pressure. As an example, there may be employed, as the actuator 142, an actuator including a piston axially movably disposed in a cylindrical tube with the piston and a runner being magnetically coupled by magnets attached to the piston and the runner, respectively. The piston is movable by compressed air supplied and discharged through pneumatic ports defined in the opposite ends of the cylindrical tube. Any of various other actuators may also be employed as the actuator 142. The cylindrical tube 144 extends parallel to the guide rails 106 and has opposite ends fixed by brackets to the lower plate 82. The runner 146 is connected to the sixth hanger 112-6. Thus, the sixth hanger 112-6 can be actuated by the actuator 142 for increasing or reducing the distances between the hangers. In operation, the runner 146 is moved between a first position near one end of the cylindrical tube 144 and a second position near the opposite end of the cylindrical tube 144. When the runner 146 is in the first position, the clamp hangers are closely disposed in mutual contact as shown in FIG. 8. Conversely, when the runner 146 is in the second position, the distances between the clamp hangers are increased to a maximum allowed by the stopper bolts, as indicated by the imaginary lines in FIG. 9.

The clamps 102 are disposed in two rows, as described above. The first row of clamps is unable to move laterally across the frame 80 since these clamps are fixed to the respective clamp hangers. The hangers in the second row are however laterally movable across the frame 80 because they are slidably mounted by the guide rods 114 on the respective clamp hangers. The parts spreading mechanism unit 36 includes an arrangement for selectively increasing and reducing the distance between these clamp rows to a prescribed distance. Such an arrangement includes a mechanism for simultaneously moving the second row of clamps laterally across the frame 80 by transversely moving the second cam member 125 which extends through the clamps in the second row. As shown in FIGS. 7, 8, and 12, such a mechanism includes a second pneumatic actuator 148 fixed to the lower plate 82 and having a horizontal operating rod 148a extending transversely across the frame 80. A link rod 150 is coupled at its central portion to the rod 148a and extends longitudinally along the frame 80. The opposite ends of the link rod 150 are guided for transverse movement in oblong holes 152a (FIG. 11) defined in the brackets 152 on the opposite ends of the lower plate 82. The opposite ends of the link rod 150 are also coupled by a pair of link plates 154, respectively, to the ends of the second cam member 125. The link plates 154 are pivotally attached to the respective brackets 152 by means of pins 155, and each of the plates 154 have an oblong hole 154a defined in the upper end thereof and through which one end of the link rod 150 is inserted and another oblong hole 154b defined in the lower end thereof and through which one end of the second cam member 125 is inserted. The end of the second cam member 125 (from which the clamp hangers are spaced apart when they are clustered) is guided in and by a horizontal oblong hole 84a (FIG. 11) defined in the end plate 84. When the second actuator 148 is controlled to project its operating rod 148a, the second cam member 125 is moved from the first position (FIG. 12), in which the second row of clamps is close to the first row of clamps, to the second position, in which the second row of clamps is spaced a given distance from the first row of clamps. As the actuator rod 148a is retracted, the second cam member 125 is returned from the second position to the first position.

In order to pick up the camshaft holders CH from the tray 65 of the parts stocker 32, the runner 146 of the first actuator 142 for actuating the clamp hangers is set in the first position, and the second cam member 125 is set in the first position. At this time, the relative positions of the respective clamps correspond respectively to the relative positions of the closely clustered camshaft holders in one set placed on the tray 65. Therefore, the clamps can clamp the camshaft holders and pick up them simultaneously from the tray. While the clamped camshaft holders are being transferred to a cylinder head, the first actuator 142 is operated to increase the distances between the clamp hangers to prescribed maximum distances allowed by the stopper bolts, and at the same time the second actuator 148 is operated to move the second cam member 125 to the second position for thereby increasing the distance between the clamp rows to a prescribed distance. The clamps are therefore spread to their spread positions, respectively. The relative positions of the respective camshaft holders CH clamped by the clamps, which are now in the spread positions, correspond respectively to relative positions which will be assumed by the camshaft holders installed on the cylinder head. Consequently, the camshaft holders clamped in the spread positions can simultaneously be set over the cylinder head.

As illustrated in FIGS. 7 and 8, the parts spreading mechanism unit 36 has seats 156 located at the ends of the lower plate 82 for receiving the jaws 60 on the upper ends of the presser arms 56 of the pressing device 30. When the parts or camshaft holders are being pressed onto the workpiece or cylinder head, the presser arms 56 engage the seats 156 and press the parts spreading mechanism unit 36 which clamps the camshaft holders against the cylinder head on the feed pallet 41. The parts spreading mechanism unit 36 also includes air nozzle sensors for detecting present positions of the pneumatic actuators in the unit 36, and pneumatic connectors interconnecting the pneumatic actuators and the air nozzle sensors. When the unit 36 is attached to the carriage 72 of the parts transfer device, these pneumatic connectors are coupled to connectors (not shown) on the carriage 72. The connectors on the carriage 72 are connected to a suitable pneumatic pressure circuit which is appropriately controlled by the controlled system. The sensors, connectors, and pneumatic pressure circuit as described above will not be described in detail as they could easily be designed by those skilled in the art based on the disclosure of the present invention.

6. Bolt fastening device

The bolt fastening device 38 includes a bolt setter 157 for setting bolts in the bolt holes of the camshaft holders, and a bolt driver 158 for turning and tightening the bolts set in the bolt holes of the camshaft holders, as shown in FIG. 1. The bolt setter 157 comprises a bolt locator 160 for positioning the bolts in a prescribed pattern, a bolt feeder 162 for supplying bolts to the bolt locator 160, and a moving system 164 for moving the bolt locator 160 between the bolt feeder 162 and the workpiece or cylinder head on the pallet disposed in the working position of the pressing device 30.

As shown in FIGS. 1 through 3, the moving system 164 includes a pair of parallel fixed rails 166 disposed above the feed line downstream of the pressing device 30 in the direction of the arrow F, the rails 166 extend horizontally in the direction of feed (the X-axis direction) of the pallet 41 in the pressing device 30. A beam 168 extends across and between the rails 166 in the Y-axis direction normal to the X-axis direction, the beam 168 being movable in the X-axis direction along the rails 166. A slider 170 is mounted on the beam 168 and movable in the Y-axis direction along the beam 168. A carriage 172 is mounted on the slider 170 for vertical movement in the Z-axis direction. The moving system 164 also includes actuators of general construction which are controlled by the control system for actuating the beam 168, the slider 170, and the carriage 172, respectively. The carriage 172 has a horizontal arm 172a having a distal end to which a pair of downwardly extending vertical locating pins 176 (FIG. 2) is secured. The bolt locator 160 is detachably mounted on the locating pins 176. In this embodiment, the bolt locator 160 is constructed as a replaceable unit or tool head. By replacing the bolt locator unit with any of various other units, the parts installing system can be employed for installing parts on many different engines and other workpieces.

As shown in FIGS. 13 through 17, the bolt locator unit 160 includes a casing 177 of a substantially elongate rectangular shape when viewed in plan. The casing 177 comprises an upper case 178 and a lower case 180 which are coupled to each other by bolts 182. These upper and lower cases 178, 180 have respective deck plates 178a, 180a extending horizontally. The casing 177 has a pair of vertical sleeves 184 for accommodating therein the distal ends of the locating pins 176, respectively. The vertical sleeves 184 have respective locking mechanisms, which are of the same structure as the locking mechanisms of the parts spreading mechanism unit and will not be described in detail. In the illustrated embodiment, twelve camshaft holders are installed on a single engine, and a total of 28 bolts are required to install the camshaft holders on the engine. The bolt locator unit 160 has 28 bolt guides 185 disposed in relative positions corresponding respectively to relative positions of the bolt holes of the camshaft holders that are placed on the cylinder head. Each of the bolt guides 185 has an upper vertical guide hole 186 defined in the deck plate 178a of the upper case 178 and having a funnel-shaped upper end, a lower guide hole 188 axially aligned with the upper guide hole 186, and a pair of bolt holder pieces 190a, 190b disposed below the guide holes 186, 188.

The casing 177 houses therein a driver mechanism 192 supporting the pairs of bolt holder pieces, 190a, 190b and capable of selectively separating and joining the bolt holder piece pairs. The driver mechanism 192 includes a pair of first and second, strip-shaped main plates 193a, 193b extending longitudinally along the casing 177 substantially over the entire length thereof and supported on the casing 177 for sliding movement therealong. A pair of rib plates 194a, 194b extends horizontally perpendicularly to the main plates 193a, 193b along each of the rows of four bolt guides 185 arranged transversely across the casing 177 (the rib plate along the leftmost row of bolt guides shown in FIG. 13 has a different shape from that of the other rib plates). One of the rib plates 194a is fixed to the first main plate 193a, whereas the other rib plate 194b is fixed to the second main plate 193b. The driver mechanism 192 includes a pneumatic actuator 196 fixed to the lower case 180 and having a horizontal operating rod 196a. The rod 196a is coupled to the first and second main plates 193a, 193b through a linkage including a T link 198 and a joint rod 201. The T link 198 is of a T shape as viewed in plan, and has three horizontal arms. The T link 198 is swingably pivoted to the lower case 180 by means of a vertical pivot pin 202. The first arm of the T link 198 is in loose engagement with the first main plate 193a, whereas the second arm thereof is in loose engagement with the second main plate 193b. The third arm of the T link 198 is joined by the joint rod 201 to the operating rod 196a of the actuator 196. When the actuator 196 is operated to swing the T link 198, the first and second main plates 193a, 193b are moved longitudinally in opposite directions for thereby selectively separating and joining the paired rib plates 194a, 194b.

Figure 16:
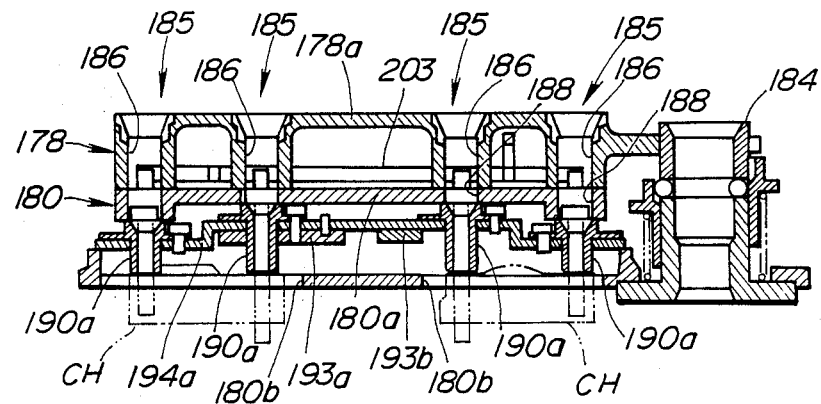
FIG. 16 is a cross-sectional view taken along line 16—16 of FIG. 13.
Figure 17:
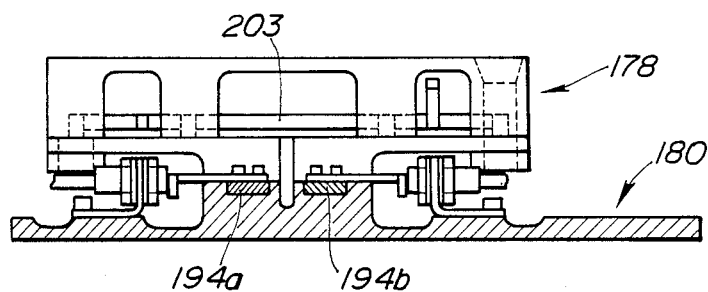
FIG. 17 is a cross-sectional view taken along line 17—17 of FIG. 13.

Four pairs of bolt holder pieces 190a, 190b are attached to each pair of rib plates 194a, 194b. One pair of bolt holder pieces 190a, 190b is composed of vertical semicylindrical halves 190a, 190b divided by a vertical plane. One of the semicylindrical halves is affixed to one of the rib plates, and the other semicylindrical half is affixed to the other rib plate. When the paired rib plates are closely held against each other, the bolt holder pieces are positioned immediately below the guide holes 188 of the lower case deck plate 180a and define therebetween vertical holes in alignment with the guide holes 188. The shank of a camshaft holder bolt which is placed into each of the bolt guides 185 enters one of the vertical holes defined by the bolt holder pieces. Each vertical hole has a diameter smaller than the diameter of the head of the camshaft holder bolt, so that the bolt BT inserted in the vertical hole can be retained therein, as shown in FIG. 15. When the paired rib plates 194a, 194b are spaced from each other by the driver mechanism 192, the distance between the bolt holder pieces 190a, 190b is increased so as to be larger than the diameter of the head of the bolt BT, which in turn is allowed to drop past the bolt holder pieces. The upper ends of the bolt holder pieces 190a, 190b are funnel-shaped to assist the bolt BT in dropping past the bolt holder pieces. As shown in FIGS. 14 and 16, the lower case 180 has openings 180b defined in the bottom thereof for allowing the lower ends of the bolt holder pieces to abut against the camshaft holders CH.

A ladder member 203 is disposed on the deck plate 180a of the lower case 180. The ladder member 203 is supported by guides (not shown) for sliding movement on the deck plate 180a, the ladder member 203 having 28 fingers 203a. A pneumatic actuator 204 is fixed to the lower case 180 for moving the ladder member 203 between first and second positions. A sensor 205 is provided for detecting when the ladder member 203 is in the first position and applying a detection signal to the control system. When the ladder member 203 is in the first position, the fingers 203a are located between the upper and lower guide holes 186, 188 of the bolt guides 185, as shown in FIG. 14. With the ladder member 203 in the second position, the fingers 203a are retracted out of the bolt guides 185. The function of the ladder member 203 will be described later on.

As shown in FIGS. 1 and 3, the bolt feeder 162 includes a plurality of bolt feeder units 206 disposed adjacent to the moving system 164 of the bolt setter 157 and in a considerably higher position. Each of the bolt feeder units 206 contains a number of bolts therein and has a chute 208. The bolt feeder units 206 discharge bolts into the chutes 208 under the control of the control system. Any of various commercially available bolt feeder units may be used as the bolt feeder unit 206. The bolt feeder 162 also includes hoppers 210 for supplying bolts to the bolt feeder units 206. In the illustrated embodiments, there are three hoppers 210 capable of supplying three types of bolts to the bolt feeder units 206. When supplying bolts to the bolt locator unit 160, the bolt locator unit 160 is moved by the moving system 164 to bring the guide holes 186 of the bolt guides 185 into positions immediately below the bolt outlets of the chutes 208. Thereafter, bolts are charged from the feeder units 206 via the chutes 208 into the guide holes 186. As shown in FIG. 1, the bolt outlets of the chutes 208 are located closely to each other. This configuration has the following advantages: First, where the distances between the guide holes 186 are equal to the distances between the lower ends of the chutes 208, two or more bolts can be supplied efficiently at the same time; and secondly even if those distances are not equal, bolts can successively be charged into the guide holes quite efficiently while the bolt locator unit 160 is being slightly moved by the moving system 164.

As shown in FIG. 2, the bolt driver 158 includes a fixed vertical rail 210 disposed above the pressing device 30, and a carriage 212 is vertically movably supported on the rail 210. The carriage 212 is controlled by the control system for its vertical movement along the rail 210. The carriage 212 supports thereon a drive unit 213 including 28 vertically rotatable drive shafts and also supports thereon a pair of vertical locating pins (not shown). A wrench unit 214 is detachably mounted as a replaceable unit or tool head on these locating pins.

Figure 18:
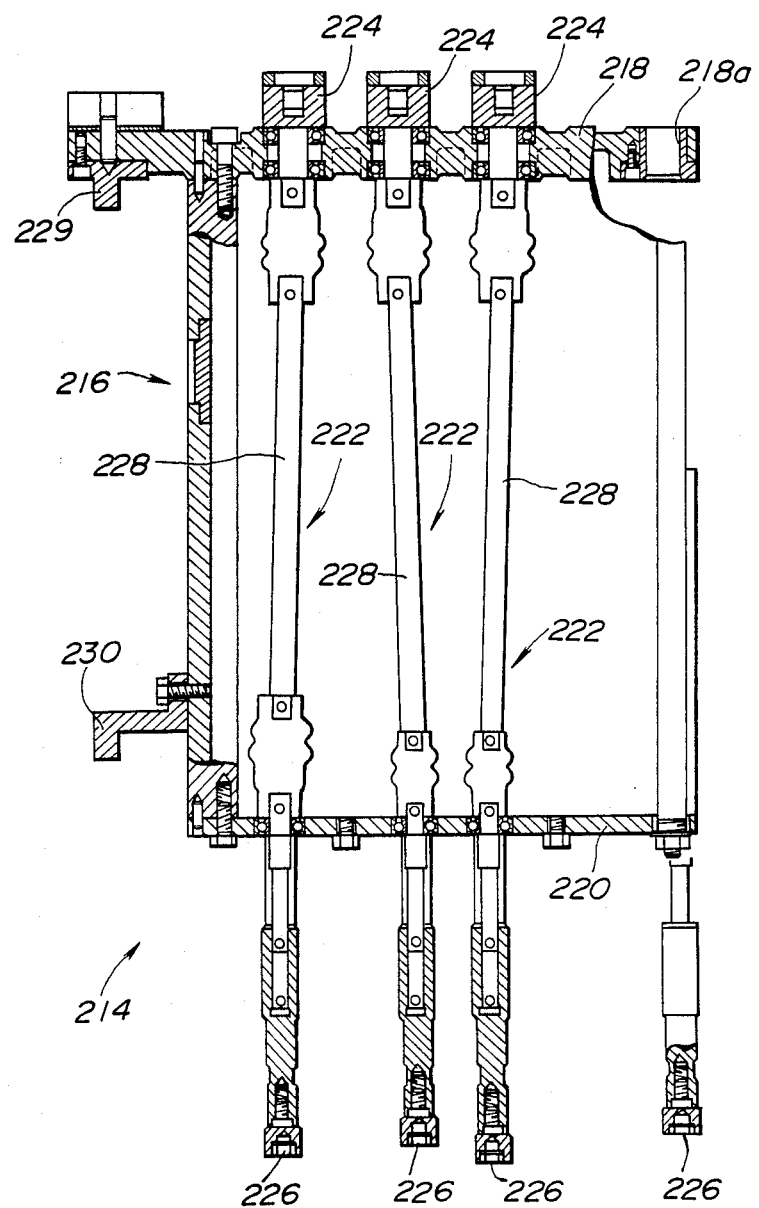
FIG. 18 is a sectional side elevational view of a wrench unit for a driver in the system of FIG. 1.

As illustrated in FIG. 18, the wrench unit 214 comprises a frame 216 including a top plate 218 and a bottom plate 220, and 28 vertical bolt runners 222 rotatably mounted on the frame 216. Each of the bolt runners 222 includes an upper socket 224 rotatably supported on the top plate 218 and a lower socket 226 rotatably supported on the bottom plate 220. These upper and lower sockets 224, 226 are interconnected by a joint shaft 228 that is coupled to the sockets 224, 226 by universal joints. Each of the upper sockets 224 has a structure capable of fitting engagement with the drive shafts, of the drive unit 213 respectively. The upper sockets 224 are disposed on the top plate 218 in the same pattern as that of the drive shafts. When the wrench unit 216 is installed on the carriage 212, the upper sockets 224 are coupled respectively to the drive shafts. Each of the lower sockets 226 has a structure capable of fitting over the heads of camshaft holder bolts. The lower sockets 226 are arranged on the bottom plate 220 in the same pattern as that of the bolt holes of camshaft holders on a cylinder head. Thus, when the wrench unit 214 is lowered, the lower sockets 226 are fitted over the heads of the bolts inserted in the bolt holes of the camshaft holders. The drive shafts are simultaneously rotated under the control of the control system so that 28 bolts required to secure the camshaft holders to one engine can simultaneously be tightened in position. The frame 216 has engaging pins 229, 230 extending downwardly from upper and lower portions thereof. These engaging pins 229, 230 are used to hang the wrench unit 214 on the tools stocker 70.

7. Tools stocker

As shown in FIGS. 19 through 23, the tools stocker 70 includes a base 231 fixed to the floor of a factory. On the base 231, there is mounted a fixed vertical tube 232 which supports a rotatable vertical post 234 through a bearing. A rotor base 235 is fixed to the lower end of the vertical post 234 and supports thereon four fixed frame racks 236 positioned at 90°-spaced positions and extending radially. Each of the frame racks 36 includes two horizontal beams, i.e., upper and lower beams 236a, 236b, having first ends secured to the vertical post 234, vertical columns 236c, 236d supporting the horizontal beams, and a support plate 236e affixed to the lower end of the vertical column 236d. The support plate 236e is of a substantially rectangular shape extending in a horizontal plane.

One frame rack can support a parts spreading mechanism unit and a wrench unit which are designed to match one engine design. Therefore, by using the tools stocker 70, it is possible to install camshaft holders on four different designs of engines. Holder bars 240, 242 having engaging grooves and extending along the upper and lower beams 236a, 236b are mounted on the upper and lower beams 236a, 236b. When the wrench unit 214 is hung on the tools stocker 70, the engaging pins 229, 230 of the wrench unit 214 engage respectively in the engaging grooves of the holder bars 240, 242. As shown in FIGS. 19 and 20, a pair of vertical fitting pins 244 and four vertical support pins 46 are attached to the upper surface of the support plate 236e. The parts spreading mechanism unit 36 is hung on the frame rack through these pins 244, 246. More specifically, as shown in FIG. 8, each of the vertical sleeves 88 of the parts spreading mechanism unit 36 has a smaller diameter at a lower end thereof than at an upper end thereof. When the parts spreading mechanism unit 36 is hung on the frame rack, 236 the fitting pins 244 are fitted in the lower ends of the vertical sleeves 88. The parts spreading mechanism unit 36 is supported in position by the support pins 246 with their upper ends held against the lower ends of the end plates 84, 86 of the parts spreading mechanism unit 36.

The tools stocker 70 includes an indexing mechanism for selectively moving one of the four frame racks 236 into a position accessible by the carriage 72 of the parts transfer device 34. The indexing mechanism includes a horizontal drive arm 250 having one end fitted over the fixed vertical tube 232 through a bearing. The drive arm 250 is thus angularly movable about the axis of the vertical post 234. As shown in FIGS. 21, and 22 the drive arm 250 has on its distal end a retractable vertical pin 252 and a pneumatic actuator 253 for selectively projecting and retracting the vertical pin 252. Four brackets 254 having respective locating holes 254a in which the vertical pin 252 is engageable are attached to the lower surface of the rotor base 235 of the frame rack. The locating holes 254a are angularly spaced at 90° about the axis of the vertical post 234. On the base 231, there is mounted a horizontal actuator cylinder unit 256 for actuating the drive arm 250. The actuator cylinder unit 256 has a cylinder body horizontally swingably coupled to the base 231 by means of a bracket 257 and an operating rod 256a pivoted to an intermediate portion of the drive arm 250. The actuator cylinder unit 256 can be extended and contracted under the control o the control system for angularly moving the drive arm 250 between first and second positions which are angularly spaced at 90° from each other. A pair of sensors 259 is mounted on the base 231 for detecting when the drive arm 250 is in the first and second positions, respectively. The base 231 also supports thereon a vertical locating pin 258 movable into and out of one of the locating holes 254a, at a time, on the lower surface of the rotor base, 235 and a pneumatic actuator 260 for selectively projecting and retracting the locating pin 258, the locating pin 258 and the pneumatic actuator 260 being mounted by a bracket 261 on the base 231.

Operation of the indexing mechanism is controlled by the control system. When the tools stocker 70 is not indexed, the locating pin 258 engages in one of the locating holes 254a to prevent the tools stocker 70 from rotating. When the tools stocker 70 is to be indexed, the drive arm 250 is moved to the first position in which the pin 252 on the distal end of the drive arm 250 engages in one of the loating holes 254a. Upon such engagement, the drive arm 250 and the rotor base 235 are angularly movable in unison with each other and also with the frame racks 236. Then, the locating pin 258 disengages from the associated locating hole 254a to allow rotation of the tools stocker 70. The drive arm 250 is moved by the cylinder unit 256 to the second position for thereby indexing the tools stocker 70° through 90°. Thereafter, the locating pin 258 engages in another locating hole to fix the tools stocker 70 against rotation.

As already mentioned above with reference to the parts spreading mechanism unit 36, the tools stocker 70 has an unlocking mechanism 98 for operating the locking mechanism 89 (FIG. 8) of the parts spreading mechanism unit. The unlocking mechanism 98 is used for transferring the parts spreading mechanism unit 36 between the carriage 72 of the parts transfer device and the frame rack 236 of the tools stocker 70. As shown in FIG. 19, the unlocking mechanism 98 includes an L-shaped arm 264 swingably coupled by a horizontal pin 266 to a fixed bracket 262 on the base 231 and a first actuator mechanism, including a cylinder unit 270 for angularly moving the L-shaped arm 264. An operating lever 272 is swingably mounted by a horizontal pin 274 on the swingable end of the L-shaped arm 264 for engaging and operating the shifters 96 of the locking mechanisms 89 of the parts spreading mechanism unit. A second actuator mechanism including a cylinder unit 276 is also attached to the L-shaped arm 264 for angularly moving the operating lever 272 with respect to the L-shaped arm 264.

The unlocking mechanism 98 is controlled for its operation by the control system. While the tools stocker 70 is being indexed, the swingable end of the L-shaped arm 264 is lowered below the rotor base 235 to allow the rotor base 235 to rotate. When the tools stocker 70 is fixed after it has been indexed, the swingable end of the L-shaped arm 264 is raised by the first actuator mechanism 270 to position the operating lever 272 in confronting relation to the parts spreading mechanism unit 36 as shown in FIG. 19. With the unlocking mechanism 98 in this position, the operating lever 272 can be moved by the second actuator mechanism to actuate the shifters 96 of the locking mechanisms 89 for unlocking the locking mechanisms. The locking mechanisms 89 thus unlocked permit the locating pins 73 of the carriage 72 to enter and leave the vertical sleeves 88 of the parts spreading mechanism unit 36. The operation of the second actuator and the movement of the carriage 72 are controlled in a coordinated fashion by the control system so as to be able to transfer the parts spreading mechanism unit 36 between the carriage 72 and one of the frame racks 236.

Since the parts spreading mechanism unit and the wrench unit are designed to suit a particular engine type, replacement of the parts spreading mechanism unit requires the wrench unit to be also replaced. In the system of the preferred embodiment, these two units can efficiently be replaced by the parts transfer device described above. More specifically, the carriage 72 of the parts transfer device has an engaging pin 72b on its upper portion for engaging in an engaging hole 218a (FIG. 19) of the wrench unit, an abutment 72c on its central portion for abutting against the lower portion of the frame 216 of the wrench unit, and the arm 72a on its lower portion for carrying the parts spreading mechanism unit. The pin 72b, abutment 72c, and arm 72a allow the parts spreading mechanism unit 36 and the wrench unit 214 to be substantially simultaneously transferred between the carriage 72 and one of the frame racks of the tools stocker 70, since a parts spreading mechanism unit and a wrench unit designed for a particular engine type are hung on one frame rack.

Replacement of these units is controlled as follows: The carriage 72 of the parts transfer device accesses the carriage 212 (FIG. 2) of the bolt driver to receive a wrench unit from the carriage 212, and then accesses an empty frame rack of the tools stocker 70 to carry the wrench unit and the parts spreading mechanism unit over to the empty frame rack. The carriage 72 receives new units from another frame rack, and then accesses the carriage 212 again to transfer the new wrench unit to the carriage 212. This process for replacing units is less time-consuming than a process by which after one unit has been replaced, another unit is replaced. The parts installing system is simple in overall construction because, with the unit replacing process of the invention, it is not necessary to provide each of the bolt driver and the parts transfer device with a moving system for replacing tool heads, i.e., a parts spreading mechanism unit and a wrench unit.

8. Operation

Operation of the overall parts installing system will be described below.

The parts installing system is used as one work station on a production line. Feed pallets supporting cylinder heads to which camshaft holders are to be installed are successively delivered on a feed line into the working position of the pressing device. In the working position, one set of camshaft holders are installed on the cylinder head on a feed pallet. Thereafter, the feed pallet is conveyed to another work station. The carriage of the parts transfer device carries a parts spreading mechanism unit suitable for use with the cylinder head on the feed pallet. The carriage on the fixed vertical rail of the bolt driver carries a wrench unit suited to the same cylinder head. Further, the carriage of the moving system of the bolt setter carries a bolt locator unit for the same cylinder head. The parts stocker accommodates a tray carrying a number of sets of camshaft holders to be installed on cylinder heads.

Each of the feed pallets is precisely positioned by the locating pins of the pressing device in the working position, and fixed in position by the holder arms of the pressing device. While the feed pallet is moving, the parts transfer device moves the parts spreading mechanism unit to a position just above one set of camshaft holders on the tray. At this time, the clamps of the parts spreading mechanism units are in a clustered position. Then, the parts spreading mechanism unit is lowered and the clamps thereof are actuated to simultaneously grip one set of camshaft holders. The actuators of the parts spreading mechanism unit are operated to spread the clamps, during which time the parts transfer device moves the parts spreading mechanism unit into a position above the cylinder head on the feed pallet in the working position. The camshaft holders held by the parts spreading mechanism unit are now positioned immediately above respective positions in which they will be installed on the cylinder head. The parts transfer device is then moved downwardly to cause the distal ends of the knock pins on the cylinder head to enter the corresponding holes in the lower surfaces of the camshaft holders. Subsequently, the pressing device is operated to enable the presser arms to depress the frame of the parts spreading mechanism unit until the knock pins are fully pressed into the holes of the camshaft holders. Then, the camshaft holders are unclamped, and the parts spreading mechanism unit is returned to the parts stocker and moved over another set of camshaft holders on the tray.

While the camshaft holders are being pressed onto the cylinder head, the moving system of the bolt setter moves the bolt locator unit to a position below the chutes of the bolt feeder, followed by the charging of bolts from the chutes into the bolt guides of the bolt locator unit. At this time, the paired bolt holder pieces are closely combined together and can hold the respective bolts. The ladder member is in the second position with the fingers thereof not projecting into the bolt guides, permitting the bolts to drop into the bolt guides. After the camshaft holders have been pressed onto the cylinder head, the bolt locator unit with the bolts charged into all of the 28 bolt guides is displaced into a position above the camshaft holders set on the cylinder head. Thereafter, the bolt locator unit descends to bring the distal ends of the bolts projecting downwardly from the casing of the bolt locator unit into the bolt holes of the camshaft holders.

Should there be a sufficient accumulation of errors of positioning control for the feed pallet and the bolt locator unit and dimensional errors of the bolts and part, the bolt ends might not actually enter the bolt holes of the camshaft holders, and defective products might result if the assembling process were continued. Therefore, it is advantageous to check at this time if the bolts have properly been inserted into the bolt holes of the camshaft holders since the finding of any defective products after they have been assembled would normally cause a relatively large loss in material, labor, and time. To this end, the ladder member in the bolt locator unit is operated to project the fingers into the bolt guides when the bolt locator unit is lowered. If the distal end of the shank of one bolt fails to be inserted properly into the corresponding bolt hole upon descent of the bolt locator unit, the shank end is held in abutment against an edge of the upper end of the bolt hole, with the bolt head projecting above from the deck plate of the lower case of the unit. If the ladder member is actuated in this condition, the finger interferes with the bolt head, preventing the ladder member from reaching the first position. This condition is detected by the control system through the sensor combined with the ladder member. Thereafter, the control system effects a suitable control sequence to set the misligned bolt properly in position. For example, the control system may move the bolt locator unit up and down, or reject the bolts held by the bolt locator unit and supply a new set of bolts from the bolt feeder.

In the event that the bolts are properly set with respect to the associated bolt holes of the camshaft holders and it is confirmed that the ladder member has been moved to the first position, then the mechanism for actuating the bolt holder pieces of the bolt locator unit is operated to release the bolts from the bolt locator unit into the bolt holes of the camshaft holders. The bolt locator unit is then moved back to the bolt feeder. The carriage of the bolt driver is thereafter operated to lower the wrench unit, thereby enabling the lower sockets of the bolt runners of the wrench unit to fit over the bolt heads. The bolt runners are rotated to tighten the bolts. During this time, the parts transfer device and the bolt setter are operated for the installation of camshaft holders on a next workpiece. After the bolts have been tightened, the wrench unit is returned to the upper position, whereupon one cycle of installation is completed. The feed pallet is delivered to the next work station for a next process such as for finishing holes which support camshafts.

As described above, the parts transfer device, the bolt setter, and the bolt driver are operated simultaneously for a high rate of production. Such simultaneous operation of the various devices is rendered more effective by an advantageous layout of the parts installing system in which (1) the parts transfer device is disposed on one side of the pressing device upstream of the working position of the pressing device with respect to the feed line, (2) the bolt setter is disposed on one side of the pressing device downstream of the working position of the pressing device with respect to the feed line, and (3) the bolt driver is disposed upstream of the working position of the pressing device with respect to the feed line.

9. Modification suitable for different engine type

As described above, the parts installing system of the present invention can be employed to install parts on a wide variety of engine designs since the parts spreading mechanism unit, the wrench unit, and the bolt locator unit are replaceable. Another specific application of the parts installing system for installing parts on a different type of engine will be described below.

In this modified application, the parts installing system is used for installing camshaft holders (parts) on the cylinder head (workpiece) of a single-overhead-camshaft (SOHC) internal combustion engine having two rocker arm shafts. As indicated by the imaginary lines in FIGS. 30 and 31, each camshaft holder CH has a bearing portion defining a half of a camshaft bearing hole, two holes 310, 312 for supporting respective rocker arm shafts, two vertical bolt holes 313, 314, for passage therethrough of bolts for fastening the camshaft holder to a cylinder head, and locating holes (not shown) in which knock pins on the cylinder head are fitted. The bolt hole 314 and the rocker arm shaft hole 310 partly intersect with each other, and hence a rocker arm shaft (not shown) to be inserted through the hole 310 has a recess to avoid physical interference with the bolt inserted through the bolt 314.

For installing camshaft holders on a cylinder head for the purpose of finishing the bearing portions for the camshafts, it is necessary to insert an actual rocker arm shaft or a dummy pin through the hole 310 to prevent the hole 310 and hence the camshaft holder from being deformed at the time the bolts are tightened. It would be more advantageous to use a dummy pin rather than an actual rocker arm shaft. Even if a dummy pin is used, however, it is generally set manually in the camshaft holder, resulting in an undesirably low installing efficiency. To overcome the above problem, a parts spreading mechanism unit employed to install parts on a workpiece in this application has a mechanism for setting a dummy pin. Such a parts spreading mechanism unit will be described in detail below. A wrench unit and a bolt locator unit employed in the modified application are different from those of the previous embodiment. However, one of ordinary skill in the art can easily understand how wrench and bolt locator units should be modified in order to suit the engine used in the present modification, based on the present disclosure, and hence such modifications of the wrench and bolt locator units will not be described.

Figure 24:
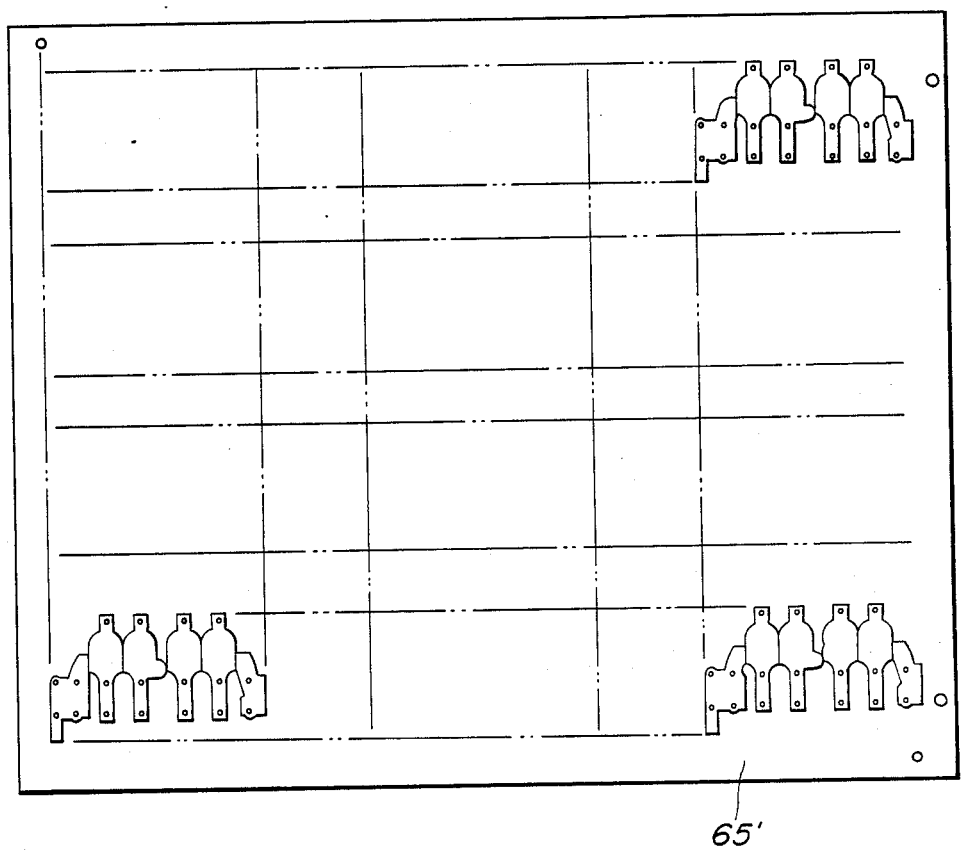
FIG. 24 is a schematic plan view of parts placed on a tray of a parts stocker in the system of FIG. 1, the parts shown here being camshaft holders in a second specific application of the system of FIG. 1.

FIG. 24 schematically shows sets of camshaft holders arranged in rows and columns on a tray 65' of a parts stocker. One set of six camshaft holders to be installed on a single engine is placed in a closely clustered condition. The tray 65' is smaller in size than the tray 65 shown in FIG. 6, but can be placed in the parts stocker 32 in the same manner as the tray 65.

Figure 25:
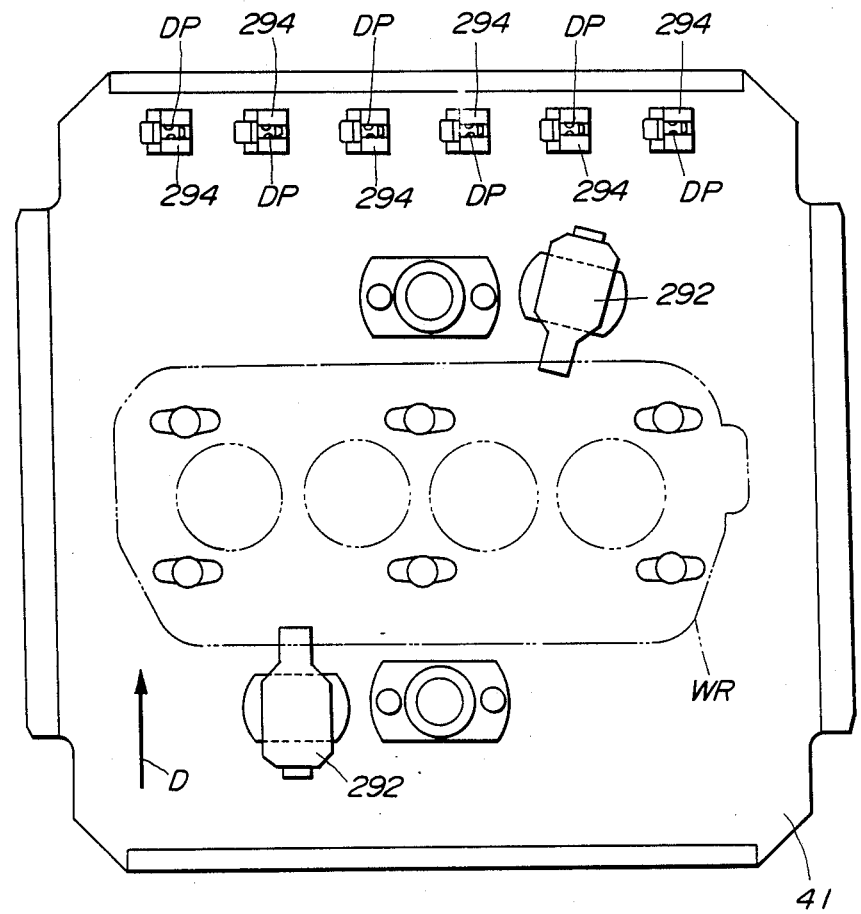
FIG. 25 is a schematic plan view showing the manner in which a cylinder block on which camshaft holders of FIG. 24 will be installed is placed on a feed pallet.
Figure 26:
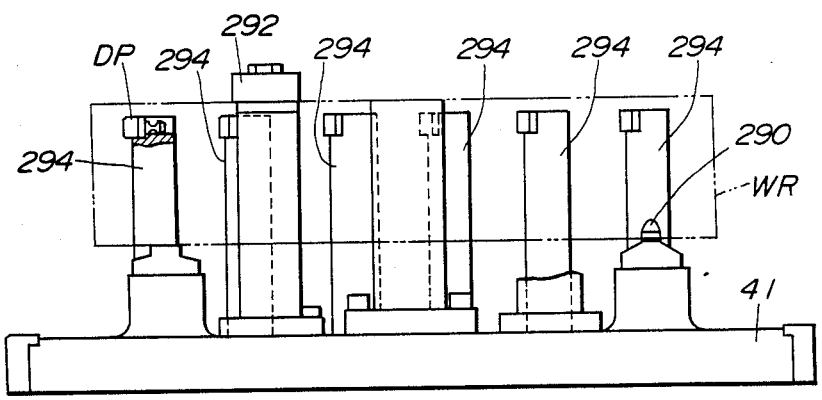
FIG. 26 is a side elevational view of the device shown in FIG. 25.
Figure 33:
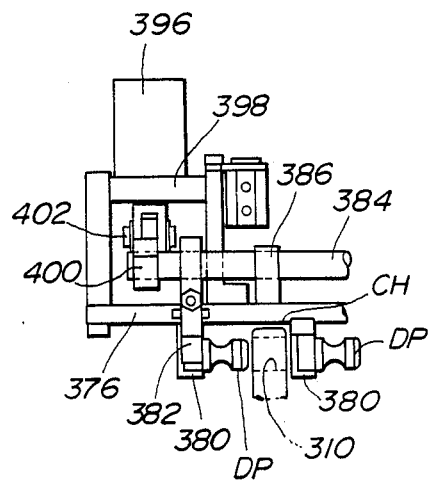
FIG. 33 is a side elevational view of a portion of the unit of FIG. 27, as viewed in the direction of the arrow 33 in FIG. 27.

FIGS. 25 and 26 illustrate the manner in which a workpiece (cylinder head) WR and a dummy pin DP are placed on the feed pallet 41. The feed pallet 41 is moved into and out of the pressing device in the direction of the arrow D. The cylinder head WR is positioned on and secured to the pallet 41 by means of locating pins 290 and clamp members 292 on the pallet 41. Six dummy pins DP are placed on the heads of mount posts 294 fixed to the pallet 41. As shown in FIG. 33, each of the dummy pins DP has a smaller-diameter waist for avoiding physical interference with a bolt for fastening a camshaft holder, and a grip to be gripped by a dummy pin gripper mechanism (described later). The dummy pins on the mount posts 294 are oriented in the same direction as that in which they will be set in camshaft holders on a cylinder head. The spacings between the dummy pins are also the same as those at which the dummy pins set in the camshaft holders on the cylinder head are spaced.

As illustrated in FIGS. 27 through 34, a parts spreading mechanism unit 315 has a frame 316 comprising upper and lower plates 318, 320 extending horizontally and having an elongate rectangular shape, and a plurality of vertical joint columns 322 interconnecting the upper and lower plates 318, 320. A pair of vertical sleeves 88 is mounted on the frame 316 near its opposite ends for receiving the distal ends of the locating pins 73 of the carriage 72 of the parts transfer device (see FIG. 2). Each of the sleeves 88 has a locking mechanism 89, which is identical to the locking mechanism of the unit of FIG. 8, and a shifter 96 for the locking mechanism 89.

Seats 324 are mounted respectively on the opposite ends of the frame 316 for receiving thereon the jaws 60 of the presser arms of the pressing device.

Six clamps are suspended by a suspension 328 on the frame 316 for holding the six camshaft holders. The suspension 328 includes a pair of parallel horizontal guide rails 340 extending longitudinally along the frame 316 below the lower plate 320. The guide rails 340 have opposite ends supported by brackets 342, 344, respectively, attached to the lower surface of the lower plate 320 at the respective opposite ends of the frame 316. A fixed clamp (first clamp) 346-1 is affixed to the bracket 342. Five movable clamps 346-2 through 346-6 (from a second clamp closest to the first clamp to a sixth clamp farthest from the first clamp) are slidably disposed on the guide rails 340.

Figure 30:
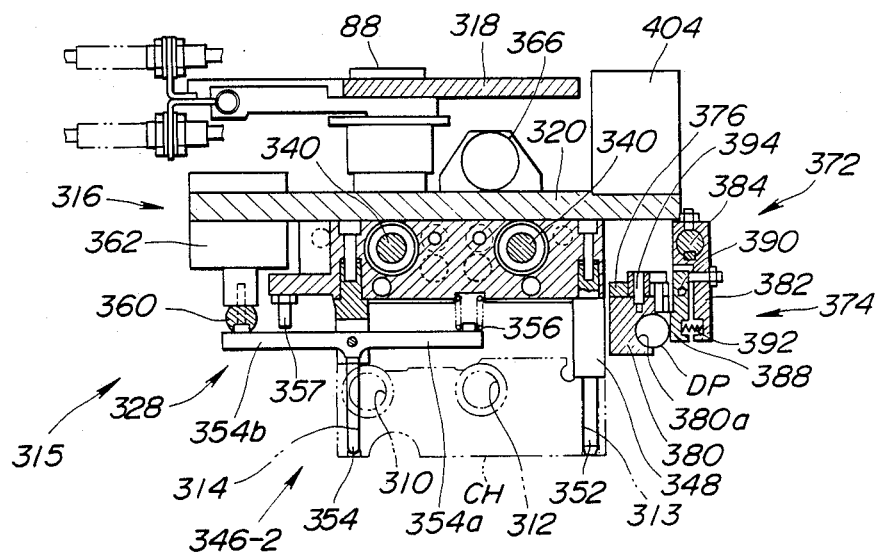
FIG. 30 is a cross-sectional view taken along line 30—30 of FIG. 28.
Figure 31:
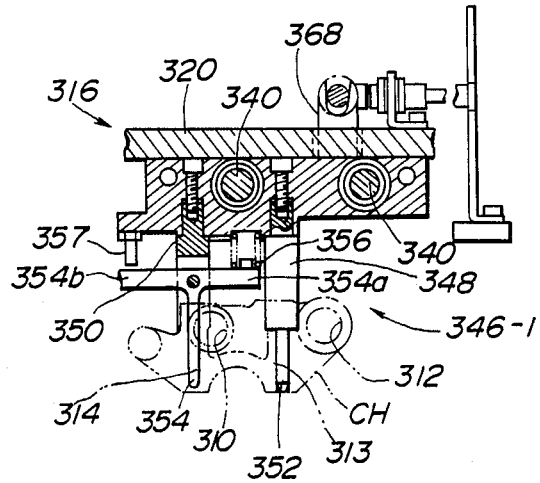
FIG. 31 is a cross-sectional view taken along line 31—31 of FIG. 28.

The clamps of the parts spreading mechanism unit 315 will be described below. When camshaft holders are clamped by the clamps of the unit 315, each of the camshaft holders, except for the camshaft holder clamped by the sixth clamp, is clamped through two bolt holes in the camshaft holder. The exceptional camshaft holder is clamped through four holes including the two bolt holes and two additional holes. FIG. 30 shows the second clamp 346-2, and FIG. 31 shows the first clamp 346-1. The third through fifth clamps 346-3 through 346-5 are of the same structure as the second clamp. In FIGS. 30 and 31, each of the clamps has first and second columns 348, 350 spaced from each other transversely across the frame 316, the columns 348, 350 extends downwardly and have vertical pins 352, 354 respectively on their lower ends. The pins 352, 354 will be inserted through the bolt holes of a camshaft holder CH and engage the inner surfaces of the bolt holes. The pin 352 is secured to the first column 348 and will be inserted in a bolt hole 313 of the camshaft holder CH. The clearance between the pin 352 and the inner surface of the bolt hole 313 is so small that the pin 352 can serve to position the clamped camshaft holder CH with respect to the clamp. The other pin 354 is movable toward and away from the fixed pin 352 and will be inserted in a bolt hole 314 of the camshaft holder CH. The clearance between the movable pin 354 and the inner surface of the bolt hole 314 is relatively large. Therefore, the camshaft holder CH can be clamped and unclamped by movement of the movable pin 354. The movable pin 354 has an upper end pivoted to the second column 350 and includes arms 354a, 354b extending horizontally from the upper end thereof respectively toward and away from the first column 148. The arm 354a has a swingable end urged downwardly by a spring 356 to bias the lower end of the movable pin 354 in a direction away from the fixed pin 352. The clamp also has a stopper pin 357 for limiting upward swinging movement of the arm 354b.

The sixth clamp 346-6 serves to clamp a camshaft holder through four vertical holes therein. The sixth clamp has four vertical columns, two of which are identical to the first column 348 of the first clamp 346-1 shown in FIG. 31, with the remaining two being identical to the second column 350 of the first clamp 346-1. Thus, the sixth clamp 346-6 is similar to a dual structure combining two first clamps.

The parts spreading mechanism unit 315 includes a clamp actuator mechanism for simultaneously clamping and unclamping the first through sixth clamps. The clamp actuator mechanism includes a horizontal rod 360 extending longitudinally along the frame 316 over the entire length thereof. The horizontal rod 360 has opposite ends guided by guides 362 so as to be vertically movable. The lower surface of the horizontal rod 360 engages the swingable end of the arm 354b of the movable pin 354 of each clamp. The clamp actuator mechanism includes a first pneumatic actuator 362 for vertically moving the horizontal rod 360, the first pneumatic actuator 362 being secured to the lower plate 320 and having a downwardly extending vertical operating rod coupled to a central portion of the horizontal rod 360. The actuator, 362 is pneumatically controlled to vertically move the horizontal rod 360 to operate the movable pins of the clamps for selectively clamping and unclamping the six clamps simultaneously.

The parts spreading mechanism unit 315 includes an arrangement for selectively increasing and reducing the distances between the clamps to prescribed intervals. Such an arrangement includes a limiting mechanism for limiting the distances between the clamps, and a moving mechanism for moving the clamps.

Figure 29:
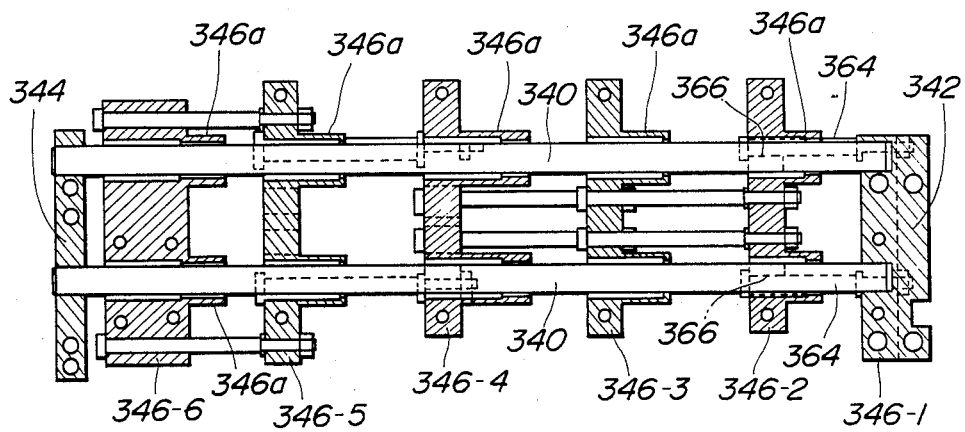
FIG. 29 is a plan view, partly in cross section, of a clamp interval limiting mechanism of the unit of FIG. 28.

The limiting mechanism is essentially of the same as the mechanism shown in FIG. 9. As illustrated in FIG. 29, each of the first through fifth clamps 346-1 through 346-5 has a pair of stopper bolts for limiting the distance between itself and a next clamp (for example, the stopper bolts on the first clamp serves to limit the distance between the first and second clamps) to a certain value. More specifically, each of the stopper bolts 364 for limiting the interval between the first and second clamps 346-1, 346-2 has one end fixed to the first clamp and extends through a hole 366 in the second clamp parallel to the guide rails 340 which guide the clamps, the stopper bolts 364 having heads on opposite ends. The heads of the stopper bolts are engageable with edges of the holes 366 for limiting the maximum distance between the first and second clamps 346-1, 346-2. The third and fourth clamps 346-3, 346-4 have openings to avoid physical interference with the stopper bolts 364. The paired stopper bolts on the second through fifth clamps are identical to the paired stopper bolts 364 described above. Each of the second through sixth clamps has a pair of spacer sleeves 346a for limiting the minimum intervals between the clamps.

Figure 27:
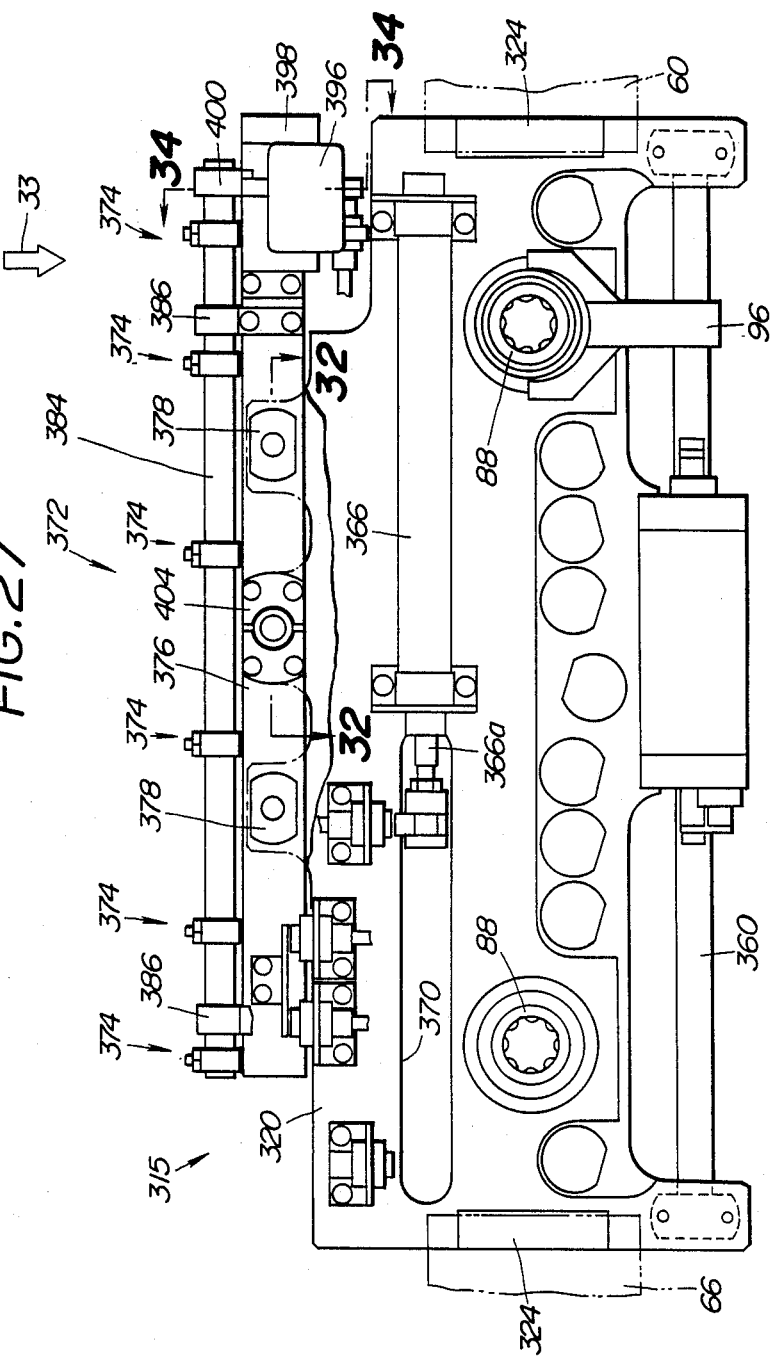
FIG. 27 is a plan view, partly broken away, of a modified parts spreading mechanism unit suitable for installing camshaft holders of FIG. 24 on the cylinder block of FIG. 25.
Figure 28:
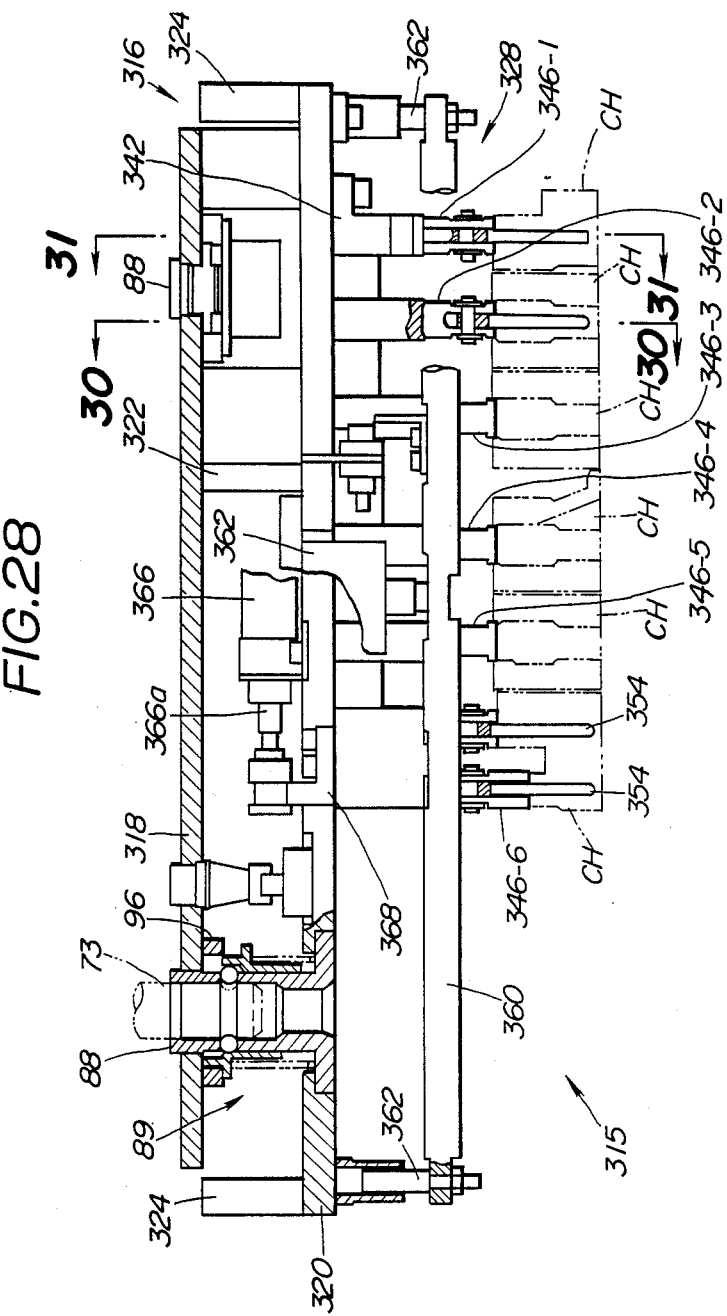
FIG. 28 is a side elevational view, partly in cross section, of the parts spreading mechanism unit illustrated in FIG. 27.

As shown in FIGS. 27 and 28, the clamp actuator mechanism includes a second pneumatic actuator 366 fixedly mounted on the lower plate 320 of the frame 316. The pneumatic actuator 366 has a horizontal operating rod 366a extending parallel to the guide rails 340 and axially movable. A connector 368 is secured to the upper surface of the sixth clamp 346-6 and projects upwardly through an elongate slot 370 defined in the lower plate 320. The upper end of the connector 368 is coupled to the distal end of the operating rod 366a of the pneumatic actuator 366. The second pneumatic actuator 366 is controlled by the control system for moving the sixth clamp 346-6 between first and second positions along the guide rails 340. When the sixth clamp 346-6 is in the first position, the clamps are closely positioned as shown in FIG. 28 with the spacer sleeves 346a of the respective clamps contacting adjacent clamps. When the sixth clamp is in the second position, the clamps are spaced apart at maximum distances allowed by the stopper bolts. Stated otherwise, the clamps of the parts spreading mechanism unit are operated by the second penumatic actuator to move selectively to a clustered position and a spread position.

Relative positions of the clamps which are in the clustered position correspond respectively to relative positions which will be taken by camshaft holders on a tray. Therefore, the clustered clamps can simultaneously clamp and pick up the camshaft holders from the tray. While the clamped camshaft holders are being carried over to a cylinder head, the clamps are displaced to the spread position. Relative positions of the clamps in the spread position correspond respectively to relative positions which will be assumed by the camshaft holders installed on the cylinder head. Thus, the camshaft holders clamped by the spread clamps can simultaneously be set over the cylinder head. After the camshaft holders have been placed over the cylinder head, the camshaft holders are pressed onto the cylinder head by the pressing device 30 in the same manner as described above with reference to the preceding embodiment.

Figure 32:
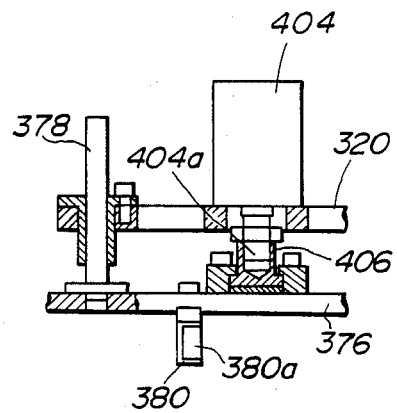
FIG. 32 is a cross-sectional view taken along line 32—32 of FIG. 27.
Figure 34:
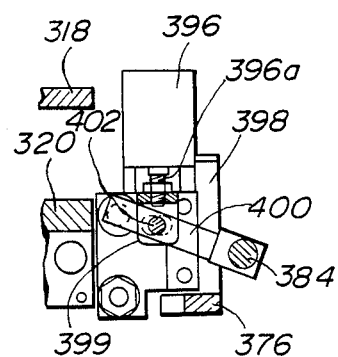
FIG. 34 is a cross-sectional view taken along line 34—34 of FIG. 27.

The parts spreading mechanism unit 315 has a dummy pin setter 372 for picking up dummy pins from the mount posts 294 of the feed pallet 41, and setting the dummy pins respectively in the rocker arm shaft holes 310 of the camshaft holders pressed on the cylinder head. The dummy pin setter 372 has six gripper hands 374 mounted in a row on a common support plate 376. The gripper hands 374 are simultaneously operated to grip six dummy pins required to be inserted in one set of camshaft holders. The support plate 376 is vertically movably mounted on the frame 316 of the parts spreading mechanism unit. A mechanism is provided for vertically moving the support plate 376 to vertically displace the gripper hands 374 with respect to the frame 316. More specifically, as shown in FIGS. 27, 30, and 32, the support plate 376 is a strip-shaped plate extending on one side of the frame 316 in the longitudinal direction thereof, and is guided for vertical movement by a pair of guides 378 fixed to the frame 316. Each of the gripper hands 374 includes a fixed finger 380 and a movable finger 382 for jointly gripping a dummy pin DP therebetween. The six fixed fingers 380 of the six gripper hands 374 are arrayed on the support plate 376 at spacings between dummy pins placed on the mount posts 294 on the feed pallet, i.e., at intervals between dummy pins set in the respective camshaft holders pressed on the cylinder head. As illustrated in FIG. 32, each of the fixed fingers 380 projects downwardly from the support plate 376 and has in a lower end portion thereof a semicircular recess 380a complementary in shape to a spherical surface of a dummy pin DP where it is gripped. The six movable fingers 382 of the six gripper hands are fixed to a common operating shaft 384 for simultaneous angular movement. The common shaft 384 extends parallel to the support plate 376 and is angularly movably supported on the support plate 376 through a pair of brackets 386. As shown in FIG. 30, each of the movable fingers 382 has one end fixed to the drive shaft 384 with a holder tip 388 on the opposite end. The holder tip 388 is disposed in confronting relation to the fixed finger 380 and is swingably attached to the movable finger 382 by a pin 390. The lower end of the holder tip 388 is normally urged by a spring 392 to move toward the semicircular recess 380a of the fixed finger 380. A nozzle 394 of an air sensor of a known construction is disposed in the fixed finger 380. When an air flow from the air sensor nozzle 394 is blocked by a gripped dummy pin DP, the control system connected to the air sensor recognizes the presence of the dummy pin DP. As shown in FIGS. 33 and 34, a third pneumatic actuator 396 is fixed to one end of the support plate 376 by means of a mount 398, the actuator 396 having a vertical operating rod 396a. The operating rod 396a extends downwardly and has a lower end to which a connector 399 having an oblong hole is attached. To one end of the drive shaft 384 supporting the movable fingers, there is fixed one end of a lever 400 having on the opposite end a pin 402 engaging in the oblong hole in the connector 399. When the third pneumatic actuator 396 is operated, the operating rod 396a vertically swings the lever 400 for selectively clamping and unclamping the six dummy pin gripper hands simultaneously. The mechanism for vertically moving the support plate 376 comprises a fourth pneumatic actuator 404 affixed to the unit frame 316 and having a vertical operating rod 404a, as shown in FIG. 32. The operating rod 404a extends downwardly and has a lower end coupled by a connector 406 to the support plate 376. When the fourth pneumatic actuator 404 is operated, the operating rod 404a vertically moves the support plate 376 between upper and lower positions for vertically moving the gripper hands 374 on the support plate 376.

The dummy pin setter 372 thus constructed operates as follows: After camshaft holders have been pressed onto a cylinder head, the parts spreading mechanism unit 315 is operated to unclamp the installed camshaft holders. At this time, the fingers of the dummy pin gripper hands 374 of the dummy pin setter are closed, and the support plate 376 supporting the gripper hands 374 is in the upper position. Then, the carriage 72 of the parts transfer device moves the unit 315 toward dummy pins on the mount posts. The third pneumatic actuator 396 is operated to open the fingers of the gripper hands 374, and simultaneously, the fourth pneumatic actuator 404 is operated to lower the support plate 376, so that the movable and fixed fingers of the gripper hands 374 are positioned on opposite sides of the dummy pins. The third pneumatic actuator 396 is operated again the enable the gripper hands 374 to grip the respective dummy pins. Thereafter, the carriage 72 moves the parts spreading mechanism unit 315 to insert the gripped dummy pins into the holes 310 of the respective camshaft holders which partly intersect with the bolt holes 314 therein. The third pneumatic actuator 396 is operated to open the gripper hands 374 to release the dummy pins, followed by returning movement of the unit 315 back to a position above the tray of the parts stocker 32. All of the actuators on the unit 315 are returned to their original positions. Subsequently, the camshaft holders are fastened by bolts to the cylinder head in the same manner as described above with reference to the preceding embodiment.

Like the unit shown in FIG. 8, the parts spreading mechanism unit 315 has pneumatic connectors for pneumatic actuators and air nozzle sensors. Such pneumatic connectors will not be described since they could easily be designed by one skilled in the art.

The above embodiments are specifically directed to parts installing systems for installing camshaft holders on cylinder heads. However, it will be understood that various systems for installing various parts on different workpieces can be accomplished by applying slight and obvious modifications to the illustrated systems. For example, the installing system of the present invention could be employed on an automobile production line for installing bearing caps which support the crankshaft of a multicylinder internal combustion engine on the cylinder block of the engine, or on any of various production lines for installing a plurality of parts substantially simultaneously on a workpiece to achieve an improved production rate.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A system for installing a plurality of camshaft holders substantially simultaneously on a cylinder head of an internal combustion engine having an overhead-camshaft valve train to hold a camshaft on the cylinder head, the system comprising:
    parts stocker means for stocking thereon a cluster of substantially closely placed camshaft holders to be installed;
    transfer spreading means for spreading the camshaft holders to respective required positions while transferring the camshaft holders from the parts stocker means to a location near a cylinder head;
    pressing means for pressing the camshaft holders onto the cylinder head; and
    fixing means for securely fixing the camshaft holders to the cylinder head;
    said transfer spreading means including means for simultaneously picking up and transferring one set of camshaft holders to be installed on a single cylinder head.

2. A system for installing a plurality of parts substantially simultaneously on a workpiece, comprising:
    parts stocker means for stocking thereon a cluster of substantially closely placed parts to be installed;
    transfer spreading means for spreading the parts to respective required positions while transferring the parts from the parts stocker means to a location near the workpiece;
    pressing means for pressing the parts onto the workpiece; and
    fixing means for securely fixing the parts to the workpiece;
    said transfer spreading means including means for simultaneously picking up and transferring one set of parts to be installed on a single workpiece; and
    said fixing means comprising bolt fastening means for fastening the parts pressed onto the workpiece to the workpiece with bolts.

3. A system according to claim 2, wherein said bolt fastening means comprises means for setting the bolts on the parts on the workpiece, means for supplying bolts to said means for setting the bolts, and means for tightening the bolts set on the parts.

4. A system according to claim 3, wherein said pressing means comprises a pressing device for cooperating with a feed line along which a feed pallet with a workpiece placed thereon travels in one direction, said pressing device having a working position in which the parts are pressed onto the workpiece when said feed pallet is in said working position;
    said feed line feeding said feed pallet to and from said working position of said pressing device;
    said transfer spreading means including a first moving system disposed on one side of said pressing device upstream of said working position with respect to said feed line;

said means for setting the bolts including a second moving system disposed on one side of said pressing device downstream of said working position with respect to said feed line; and said means for tightening the bolts including a bolt driver disposed above said working position.

5. A system according to claim 2, wherein:

the workpiece comprises the cylinder head of an internal combustion engine having an overhead-camshaft valve train, said valve train including a camshaft, a rocker arm, and a rocker shaft on which said rocker arm is angularly movably supported;

said parts comprising camshaft holders for holding said camshaft and said rocker shaft on said cylinder head, said camshaft holders having rocker shaft holes for passage therethrough said rocker shaft;

said pressing means comprising a pressing device for cooperating with a feed line along which a feed pallet with a workpiece placed thereon travels in one direction;

said feed pallet having mounts for placing therein dummy pins to be mounted in rocker shaft holes in said camshaft holders;

said transfer spreading means including means for picking up dummy pins from said mounts and inserting the picked-up dummy pins into the respective rocker shaft holes in said camshaft holders on said cylinder head; and said bolt fastening means being arranged to tighten the bolts after the dummy pins have been inserted in the rocker shaft holes.

6. A system for installing a plurality of parts substantially simultaneously on a workpiece, comprising:

parts stocker means for stocking thereon a cluster of substantially closely placed parts to be installed;

transfer spreading means for spreading the parts to respective required positions while transferring the parts stocker means to a location near the workpiece;

pressing means for pressing the parts onto the workpiece; and fixing means for securely fixing the parts to the workpiece;

said transfer spreading means including a means for simultaneously picking up and transferring one set of parts to be installed on a single workpiece; and said transfer spreading means comprising a parts spreading mechanism unit including:

a frame;

a plurality of clamps for clamping parts, respectively; and means for hanging said clamps on said frame while allowing said claims to be movable between a position in which the clamps are clustered and a position in which the clamps are spread.

7. A system according to claim 6, wherein said parts stocker means includes a tray for placing thereon sets of clustered parts, to be installed on respective workpieces, and a support supporting said tray, said parts spreading mechanism unit being arranged to pick up one of the sets of clustered parts simultaneously.

8. A system for installing a plurality of parts substantially simultaneously on a workpiece, comprising:

parts stocker means for stocking thereon a cluster of substantially closely placed parts to be installed;

transfer spreading means for spreading the parts to respective required positions while transferring the parts from the parts stocker means to a location near the workpiece;

pressing means for pressing the parts onto the workpiece; and fixing means for securely fixing the parts to the workpiece;

said transfer spreading means including means for simultaneously picking up and transferring one set of parts to be installed on a single workpiece; and said transfer spreading means comprising a parts spreading mechanism unit including:

a frame;

a plurality of clamps for clamping parts, respectively;

means for hanging said clamps on said frame in a row and guiding said clamps so as to be movable along the row;

means for limiting the interval between two adjacent clamps in the row to a prescribed distance; and actuating means for selectively increasing the reducing the interval between the adjacent clamps.

9. A system according to claim 8, wherein said parts spreading mechanism unit further includes a plurality of rows of clamps, and actuating means for selectively increasing and reducing the interval between the rows of clamps.

10. A system according to claim 8, wherein said means for limiting the interval comprises a stopper bolt, said stopper bolt having one end fixed to one of the adjacent clamps in the row and an opposite end engageable with the other of the adjacent clamps for thereby limiting the interval between the adjacent clamps to said prescribed distance.

11. A system according to claim 10, wherein the clamps include at one end of the row thereof a clamp fixed to said frame, said actuating means comprising an actuating mechanism for actuating a clamp at an opposite end of the row of clamps.

12. A system according to claim 8, wherein said parts stocker means includes a tray for placing thereon sets of clustered camshaft holders, to be installed on respective cylinder heads, and a support supporting said tray, said parts spreading mechanism unit being arranged to pick up one of the sets of clustered camshaft holders simultaneously.

13. A system for installing a plurality of parts substantially simultaneously on a workpiece, comprising:

parts stocker means for stocking thereon a cluster of substantially closely placed parts to be installed;

transfer spreading means for spreading the parts to respective required positions while transferring the parts from the parts stocker means to a location near the workpiece;

pressing means for pressing the part onto the workpiece; and fixing means for securely fixing the parts to the workpiece;

said transfer spreading means including means for simultaneously picking up and transferring one set of parts to be installed on a single workpiece;

said pressing means comprising a pressing device having a working position;

said fixing means including a bolt tightening device including a plural of replaceable bolt tightening units;

said transfer spreading means including a plurality of replaceable parts spreading mechanism units;

said parts installing system further including a tools stocker for storing said bolt tightening units and said parts spreading mechanism units;

said transfer spreading means further including a moving system having a carriage for carrying one of said parts spreading mechanism units at a time, said carriage being movable to access said working position of the pressing device, said tools stocker, and said bolt tightening devices; and said carriage having a carrying mechanism for carrying one of said bolt tightening units at a time, whereby said carriage can transfer said one bolt tightening unit between said tools stocker and said bolt tightening device.

14. A system for installing a plurality of parts substantially simultaneously on a workpiece, comprising:

parts stocker means for stocking thereon a cluster of substantially closely placed parts to be installed;

transfer spreading means for spreading the parts to respective required positions while transferring the parts from the parts stocker means to a location near the workpiece;

pressing means for pressing the parts onto the workpiece; and cylinder head fixing means for securely fixing the parts to the workpiece;

said transfer spreading means including means for simultaneously picking up and transferring one set of parts to be installed on a single workpiece;

said fixing means including a bolt tightening device including a plurality of replaceable bolt tightening units;

said transfer spreading means including a plurality of replaceable parts spreading mechanism units;

said parts installing system further including a tools stocker for storing said bolt tightening units and said parts spreading mechanism units;

said tools stocker comprising:

a stationary base;

a rotor rotatable about a vertical axis and supported on said base, said rotor having a plurality of frame racks for supporting said bolt tightening units and said parts spreading mechanism units;

a horizontal swingable arm swingable about said vertical axis and supported on said base, said horizontal swingable arm having an operable pin on a swingable end thereof;

said rotor having a plurality of locating holes in which said pin of said swingable arm is selectively engageable, said locating pins being angularly spaced at prescribed angular intervals;

an operable locating pin mounted on said base and engageable selectively with said locating holes;

actuator means for actuating said pin of said swingable arm selectively into and out of one of said locating holes at a time; and actuator means for actuating said locating pin of said base selectively into and out of one of said locating holes at a time.

15. A system according to claim 14, wherein said actuator means for actuating said pin of said swingable arm includes a horizontal cylinder unit, said horizontal cylinder unit having a body swingably coupled to said base and an operating rod pivotally mounted on said swingable arm.

16. A system according to claim 17, wherein the bolt tightening unit and the parts spreading mechanism unit which are suited to a particular type of workpiece are hung on each of said frame racks.

* * * * *

UNITED STATES PATENT AND TRADEMARK OFFICE
CERTIFICATE OF CORRECTION

PATENT NO. : 4,850,102

DATED : July 25, 1989

INVENTOR(S) : Hironaka et al

It is certified that error appears in the above-identified patent and that said Letters Patent is hereby corrected as shown below:

Column 2, line 60, after "a" insert --bolt--.
Column 3, line 48, change "part" to --parts--.
Column 4, line 16, change "movable" to --movably--; line 18, change "respective" to --respectively--; line 31, change "movable" to --movably--.
Column 5, line 51, change "tool" to --tools--; line 57, change "tool" to --tools--; line 59, change "palet" to --pallet--.
Column 6, line 46, change "tool" to --tools--; line 48, change "tool" to --tools--.
Column 7, line 18, change "having" to --have--; line 59, after "and" insert --the--.
Column 8, line 18, after "124" insert --, 125--.
Column 10, line 5, change "have" to --has--.
Column 11, line 21, change ", the" to --. The--.
Column 13, line 61, delete the comma; line 62, after "213" insert a comma.
Column 14, line 23, change "36" to --236--; line 50, delete the comma; line 63, delete the comma.
Column 15, line 10, change "o" to --of--; line 19, delete the comma; line 37, after "70" delete the degree symbol.
Column 17, line 56, change "part" to --parts--.
Column 18, line 11, change "misligned" to --misaligned--.
Column 19, line 7, after "bolt" insert --hole--.
Column 20, line 30, change ", the" to --. The--; line 31, change "extends" to --extend--.
Column 21, line 21, delete "of"; line 26, change "serves" to --serve--.
Column 23, line 36, after "again" change "the" to --to--; line 63, before "installing" insert --parts--.
Column 25, line 41, (claim 6, line 7), after "parts" insert --from the parts--; line 56 (claim 6, line 22), change "claims" to --clamps--.
Column 26, line 23 (claim 8, line 27), change "the" to --and--; line 57 (claim 13, line 9), change "part" to --parts--; line 67 (claim 13, line 19), change "plural" to --plurality--.

UNITED STATES PATENT AND TRADEMARK OFFICE
CERTIFICATE OF CORRECTION

PATENT NO. : 4,850,102    Page 2 of 2

DATED : July 25, 1989

INVENTOR(S) : Horonaka et al

It is certified that error appears in the above-identified patent and that said Letters Patent is hereby corrected as shown below:

Column 27, line 26 (claim 14, line 10), delete "and cylinder head".

Signed and Sealed this

Twenty-sixth Day of November, 1991

*Attest:*

HARRY F. MANBECK, JR.

*Attesting Officer*　　　　*Commissioner of Patents and Trademarks*